United States Patent
Stockhammer et al.

(10) Patent No.: US 12,413,825 B2
(45) Date of Patent: Sep. 9, 2025

(54) SYNCHRONOUS CONTENT PRESENTATION

(71) Applicant: QUALCOMM Incorporated, San Diego, CA (US)

(72) Inventors: Thomas Stockhammer, Bergen (DE); Edward Robert Hall, Bristol (GB); Imed Bouazizi, Frisco, TX (US); Nikolai Konrad Leung, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/412,644

(22) Filed: Aug. 26, 2021

(65) Prior Publication Data

US 2022/0104010 A1 Mar. 31, 2022

Related U.S. Application Data

(60) Provisional application No. 63/084,838, filed on Sep. 29, 2020.

(51) Int. Cl.
*H04N 21/6334* (2011.01)
*H04N 21/2347* (2011.01)
(Continued)

(52) U.S. Cl.
CPC ... *H04N 21/63345* (2013.01); *H04N 21/2347* (2013.01); *H04N 21/26613* (2013.01);
(Continued)

(58) Field of Classification Search
CPC ............. H04W 12/03; H04W 12/0431; H04W 12/0433; H04N 21/2347; H04N 21/26613;
(Continued)

(56) References Cited

U.S. PATENT DOCUMENTS

| | | |
|---|---|---|
| 6,603,857 B1 | 8/2003 | Batten-Carew et al. |
| 9,026,671 B2 | 5/2015 | Gillies et al. |

(Continued)

FOREIGN PATENT DOCUMENTS

| | | |
|---|---|---|
| CN | 110880144 A | 3/2020 |
| WO | 2012138909 | 10/2012 |
| WO | 2014169233 | 10/2014 |

OTHER PUBLICATIONS

Wei J.R.L., et al., A Fully Decentralized Blockchain (Blockchain), IEEE, Jul. 14, 2019 (Jul. 14, 2019), pp. 302-307, XP033682727, DOI: 10.1109/BLOCKCHAIN.2019.00047, [Retrieved on Dec. 30, 2019], The Whole Document (6 pages).

(Continued)

*Primary Examiner* — John W Miller
*Assistant Examiner* — Akshay Doshi
(74) *Attorney, Agent, or Firm* — Polsinelli

(57) ABSTRACT

In embodiments of systems and methods for synchronous content presentation, an Edge server device may receive a decryption key for an encrypted content segment that is or will be delivered to a plurality of wireless devices over the wireless communication network, and may send the decryption key to the plurality of wireless devices after the encrypted content segment has been received by the plurality of wireless devices in a manner that enables the plurality of wireless devices to decrypt the encrypted content segment approximately simultaneously. A wireless device may receive, and optionally temporarily store, the encrypted content segment from the wireless communication network, receive the decryption key from the Edge server device after receiving the encrypted content segment, and decrypt the stored encrypted content segment using the received decryption key.

28 Claims, 15 Drawing Sheets

(51) Int. Cl.
  *H04N 21/266* (2011.01)
  *H04N 21/4405* (2011.01)
  *H04N 21/845* (2011.01)
  *H04W 12/03* (2021.01)
  *H04W 12/0431* (2021.01)
  *G07F 17/32* (2006.01)

(52) U.S. Cl.
  CPC ..... *H04N 21/4405* (2013.01); *H04N 21/8456* (2013.01); *H04W 12/03* (2021.01); *H04W 12/0431* (2021.01); *G07F 17/3288* (2013.01)

(58) Field of Classification Search
  CPC ......... H04N 21/4405; H04N 21/63345; H04N 21/8456; H04N 21/242; H04N 21/43076; H04N 21/8547; G07F 17/3288; H04L 2209/601; H04L 9/14
  See application file for complete search history.

(56) References Cited

U.S. PATENT DOCUMENTS

| | | |
|---|---|---|
| 9,900,166 B2 | 2/2018 | Luby et al. |
| 2002/0172368 A1 | 11/2002 | Peterka |
| 2003/0188188 A1* | 10/2003 | Padmanabhan ....... H04L 9/0833 380/279 |
| 2004/0158533 A1* | 8/2004 | Messick ............. H04L 12/1868 705/75 |
| 2004/0230540 A1* | 11/2004 | Crane .................. H04L 9/3073 705/76 |
| 2006/0291662 A1* | 12/2006 | Takahashi ............ H04L 63/061 380/278 |
| 2008/0232590 A1* | 9/2008 | Rivest .................... G06Q 30/02 705/50 |
| 2008/0310627 A1 | 12/2008 | Wong et al. |
| 2011/0246616 A1 | 10/2011 | Ronca et al. |
| 2012/0134496 A1* | 5/2012 | Farkash ................. H04N 19/51 380/210 |
| 2014/0012674 A1* | 1/2014 | Piccionielli ......... H01M 8/0662 705/14.55 |
| 2014/0143857 A1* | 5/2014 | Maim .................. G06F 21/6227 726/17 |
| 2015/0134533 A1* | 5/2015 | Melton ................. H04L 63/062 705/51 |
| 2016/0171828 A1* | 6/2016 | Boudreau ........... G07F 17/3244 463/25 |
| 2016/0378998 A1* | 12/2016 | Brintalos .............. G06F 21/602 380/278 |
| 2016/0381107 A1* | 12/2016 | Morgan .................. H04L 65/60 713/162 |
| 2017/0093572 A1* | 3/2017 | Hunt .................. G06Q 20/3227 |
| 2017/0094016 A1* | 3/2017 | Chen ...................... H04L 9/083 |
| 2020/0112753 A1 | 4/2020 | Stockhammer et al. |

OTHER PUBLICATIONS

International Search Report and Written Opinion—PCT/US2021/047884—ISA/EPO—Jan. 7, 2022 15 pages.
Taiwan Search Report—TW110132062—TIPO—Nov. 5, 2024.

* cited by examiner

SYNCHRONOUS CONTENT PRESENTATION

RELATED APPLICATIONS

This application claims the benefit of priority to U.S. Provisional Application No. 63/084,838 entitled "Synchronous Content Presentation" filed Sep. 29, 2020, the entire contents of which are hereby incorporated by reference for all purposes.

BACKGROUND

Fifth Generation (5G) New Radio (NR) and other communication technologies enable ultra-reliable low latency communication with wireless devices. One application for such communication systems is streaming distribution of content (such as audiovisual content). In some contexts, a content distributor or network operator may desire to control the timing at which content is presented or output by a plurality of endpoint devices for consumption. For example, in an online betting or wagering scenario, if some users can view the content before other users, the earlier users may have an unfair advantage in placing wagers. As another example, the distributors of popular streaming content, such as a mystery or a drama, may wish to control the timing of the viewability of the content. If some users can view the content earlier than other users, for example, the resolution of a story line or the revelation of a key story element may be leaked (sometimes called "spoilers"), which may affect the commercial value of the content as well as the enjoyability of the content.

While conventional Digital Rights Management (DRM) may be useful for controlling viewability of content that is distributed asynchronously, "live streamed" or other more synchronous content distribution poses more complex technical issues. For example, end-device client software may be developed that enables a user earlier access to streamed content through earlier downloading, decoding, and rendering of the content. However, sufficient content must be transmitted (streamed) to enable most devices to download a sufficient amount of the content to provide a smooth presentation of content (e.g., without buffer underruns, which may cause stuttering and other content presentation issues). Further, end-device client software may be hacked to enable earlier access to content, especially where there is a financial motive to do so (e.g., for wagers and betting).

SUMMARY

Various aspects include methods performed by a processor of an Edge server device for synchronous presentation of content delivered over a wireless communication network. Some aspects may include receiving in the Edge server device a decryption key for an encrypted content segment that is or will be delivered to a plurality of wireless devices over the wireless communication network, and sending the decryption key for the encrypted content segment from the Edge server device to the plurality of wireless devices after the encrypted content segment has been received by the plurality of wireless devices in a manner that enables the plurality of wireless devices to decrypt the encrypted content segment approximately simultaneously.

In some aspects, sending the decryption key for the encrypted content segment from the Edge server device to the plurality of wireless devices after the encrypted content segment has been received by the plurality of wireless devices in a manner that enables the plurality of wireless devices to decrypt the encrypted content segment approximately simultaneously may include sending the decryption key in a manner that enables the plurality of wireless devices to decrypt the encrypted content segment within five seconds of one another. In some aspects, sending the decryption key in a manner that enables the plurality of wireless devices to decrypt the encrypted content segment within five seconds of one another may include sending the decryption key to the plurality of wireless devices for reception within two seconds of one another.

In some aspects, sending the decryption key in a manner that enables the plurality of wireless devices to decrypt the encrypted content segment within five seconds of one another may include sending the decryption key to the plurality of wireless devices in a manner that enables the plurality of wireless devices to receive the decryption key within five seconds of one another.

In some aspects, sending the decryption key for the encrypted content segment from the Edge server device to the plurality of wireless devices after the encrypted content segment has been received by the plurality of wireless devices in a manner that enables the plurality of wireless devices to decrypt the encrypted content segment approximately simultaneously may include sending the decryption key at a predetermined time after the encrypted content segment was delivered to the plurality of wireless devices.

In some aspects, sending the decryption key for the encrypted content segment from the Edge server device to the plurality of wireless devices after the encrypted content segment has been received by the plurality of wireless devices in a manner that enables the plurality of wireless devices to decrypt the encrypted content segment approximately simultaneously may include determining whether all wireless devices have received the encrypted content segment, and sending the decryption key for the encrypted content segment from the Edge server device to the plurality of wireless devices in response to determining that all wireless devices have received the encrypted content segment.

In some aspects, sending the decryption key for the encrypted content segment from the Edge server device to the plurality of wireless devices after the encrypted content segment has been received by the plurality of wireless devices in a manner that enables the plurality of wireless devices to decrypt the encrypted content segment approximately simultaneously may include indicating a future time when the decryption key will be usable by the plurality of wireless devices to decrypt the encrypted content segment.

Some aspects may further include receiving in the Edge server device a second decryption key for a second encrypted content segment that is or will be delivered to the plurality of wireless devices over the wireless communication network, and sending the second decryption key for the second encrypted content segment from the Edge server device to the plurality of wireless devices after the second encrypted content segment has been received by the plurality of wireless devices in a manner that enables the plurality of wireless devices to decrypt the second encrypted content segment approximately simultaneously. In some aspects, the encrypted content segment and the second encrypted content segment each comprise an Instantaneous Decoder Refresh (IDR) frame.

Further aspects include an Edge server device having a processor configured to perform one or more operations of any of the methods summarized above. Further aspects include processing devices for use in an Edge server device configured with processor-executable instructions to perform operations of any of the methods summarized above. Further aspects include a non-transitory processor-readable storage medium having stored thereon processor-executable instructions configured to cause a processor of an Edge server device to perform operations of any of the methods summarized above. Further aspects include an Edge server device having means for performing functions of any of the methods summarized above. Further aspects include a system on chip for use in an Edge server device e and that includes a processor configured to perform one or more operations of any of the methods summarized above.

Various aspects include methods performed by a processor of a wireless device for synchronous presentation of content delivered over a wireless communication network. Some aspects may include receiving an encrypted content segment from the wireless communication network, receiving a decryption key for the encrypted content segment from an Edge server device in which the decryption key is received after reception of the encrypted content segment, and decrypting the encrypted content segment to render a decrypted content segment using the received decryption key after receiving the decryption key.

In some aspects, decrypting the encrypted content segment using the received decryption key may include decrypting the encrypted content segment in a secure zone of the wireless device. In some aspects, decrypting the encrypted content segment using the received decryption key may include decrypting the encrypted content segment upon receipt of the decryption key. In some aspects, decrypting the encrypted content segment using the received decryption key may include decrypting the encrypted content segment at a time indicated by the Edge server device. In some aspects, decrypting the encrypted content segment using the received decryption key and delivering the decrypted content segment to a content renderer is performed in a secure zone of the processor of the wireless device.

Some aspects may further include receiving a second encrypted content segment from the wireless communication network, temporarily storing the second encrypted content segment in memory, receiving a second decryption key for the second encrypted content segment from an Edge server device in which the second decryption key is received after reception of the second encrypted content segment, and decrypting the second encrypted content segment using the received second decryption key.

In some aspects, the encrypted content segment may include a segment of a content stream, and the method further may include receiving a user input indicating a wager on an event in the content stream following rendering of the decrypted content segment, and transmitting a message to a betting system indicating the wager.

Further aspects include a wireless device having a processor configured to perform one or more operations of any of the methods summarized above. Further aspects include processing devices for use in a wireless device configured with processor-executable instructions to perform operations of any of the methods summarized above. Further aspects include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system on chip for use in a wireless device and that includes a processor configured to perform one or more operations of any of the methods summarized above.

DETAILED DESCRIPTION

Figure 1A:
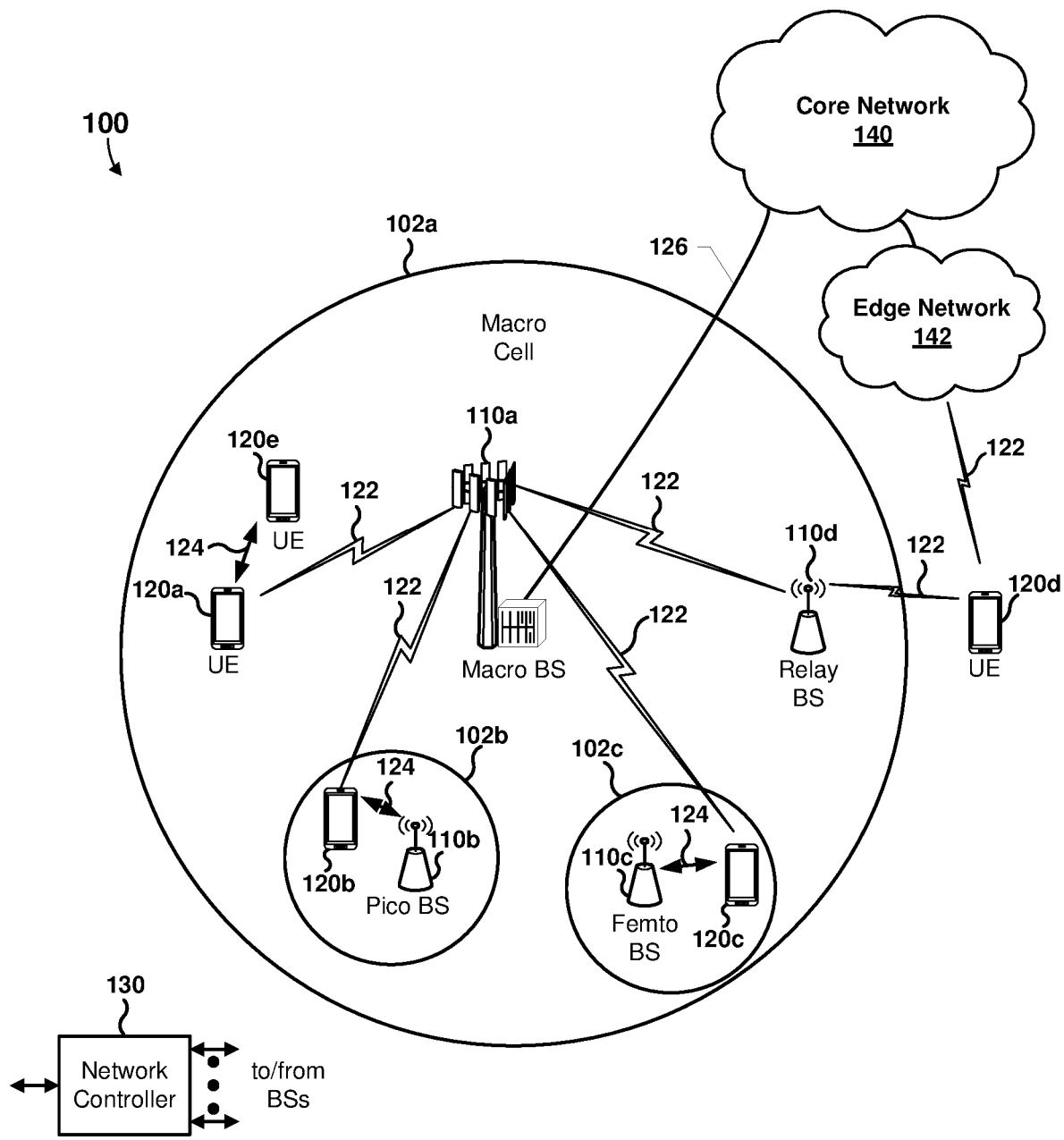
FIG. 1A is a system block diagram illustrating an example communications system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems and methods for controlling the timing at which content is presented or output by a plurality of endpoint devices for consumption (referred to herein as "synchronous presentation," e.g., of content delivered over a wireless communication network). Management of the timing at which a wireless device presents live content (such as a contemporaneous sports event, concert, theatrical show, and the like) that is transmitted or streamed over a communication network (referred to herein as "live streamed content") may be useful in numerous applications and scenarios. For example, in an online betting or wagering implementation, endpoint devices (e.g., wireless devices and user equipment) should be unable to access or present live streamed content earlier than an agreed playback time to ensure that an earlier-presenting device does not have a betting advantage over a later-presenting device. As another example, managing the presentation of live streamed content may be useful to enforce copyright, licenses, and other ownership of the content. As another example, the ability to generally synchronize the presentation of live streamed content among a plurality of devices may improve the user experience in some scenarios. An Edge computing infrastructure may be useful in such applications and scenarios because Edge computing devices may be configured to provide information and services to wireless devices with very low latency compared to more remote computing devices, such as servers in a core network, or servers even more remote than core network from the wireless device (e.g., servers that may be accessed by first traversing the core network, such as servers "in the cloud").

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palm-top computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

In some embodiments, an Edge server may transmit a decryption key to a wireless device after the wireless device has received (and, in some embodiments, buffered or temporarily stored) corresponding encrypted content. The use of an Edge server for decryption key distribution may prevent a central key management device or key repository from being overwhelmed with requests from endpoint devices for decryption keys (e.g., a DRM server "storm"). In some embodiments, the Edge computing infrastructure has the capability to distribute decryption keys to a large number of physically disbursed wireless devices with low latency, and thus may complete the decryption key distribution approximately simultaneously, that is completing distribution of the decryption keys to all receiving wireless devices within a few seconds (e.g., within less than 10 seconds for example). In some embodiments, the Edge computing infrastructure may complete the decryption key distribution to a large number of physically disbursed wireless devices within five seconds or less. In some embodiments, the Edge computing infrastructure may complete the decryption key distribution to a large number of physically disbursed wireless devices within two seconds. Delivering the decryption key to the plurality of wireless devices within such a brief window may help ensure that no wireless device user has an unfair advantage using the encrypted information, such as by placing a bet in an online betting situation. In some embodiments, the processor may use radio access network QoS and synchronization techniques to have the Edge network deliver the decryption key to the plurality of wireless devices in a manner that enables all wireless devices to receive the decryption key approximately simultaneously (e.g., within five seconds or less, within two seconds or less, etc.).

In some embodiments, a media server may send content (such as live content) to an encrypter function, e.g., an encrypter device or an encrypter module. The encrypter function may obtain a key from a key server, and using the key the encrypter function may encrypt a segment of the content. The key server may also provide the key for accessing or decrypting the content (e.g., the decryption key) to an Edge server device. The encrypter function may encrypt the content segment using the key, and may send the encrypted content segment to a server device for distribution, such as to a server device of a content distribution network (CDN). The CDN server device may provide the encrypted content segment to a plurality of wireless devices, e.g., upon request, via a push mechanism, or using another content distribution mechanism. Each wireless device may receive the encrypted content segment and, in some embodiments, may store the encrypted content segment in memory, such as storing the encrypted content segment temporarily in a buffer memory or other temporary storage. In some embodiments, each encrypted content segment may include an Instantaneous Decoder Refresh (IDR) frame. In such embodiments, the IDR frame may be associated with the decryption key in such a manner as to indicate that the decryption key is associated with the encrypted content segment.

In some embodiments, the Edge server device may send the decryption key for the encrypted content segment from the Edge server device to the plurality of wireless devices after the encrypted content segment has been received by the plurality of wireless devices in a manner that enables the plurality of wireless devices to decrypt the encrypted content segment approximately simultaneously. Each wireless device may then use the decryption key to decrypt the encrypted content segment approximately simultaneously.

In various embodiments, the relative proximity of the Edge server device to the wireless devices, and the low communication latency provided by the Edge server device, enables the Edge server device to deliver the encryption key to the wireless devices in a manner that enables the plurality of wireless devices to decrypt the encrypted content segment within a brief span of time such as within N seconds. By enabling all receiving wireless devices to decrypt the encrypted content segment within a brief span (i.e., N seconds) that is brief enough to deny some users any opportunities to take advantage or achieve an unfair advantage over others by obtaining access to the content segment before others. For example, various embodiments may be useful in gambling applications in which the encrypted content segment provides information useful for placing bets. As an example, the Edge server device may send the decryption key in a manner that enables the plurality of wireless devices to decrypt the encrypted content segment within five seconds or less of one another (i.e., N seconds is 5 seconds). In some embodiments, the Edge server device may send the decryption key in a manner that enables the plurality of wireless devices to decrypt the encrypted content segment within two seconds of one another. In some embodiments, the Edge server device may send the decryption key to the plurality of wireless devices in a manner that enables all wireless devices to receive the decryption key within five seconds or less of one another (i.e., N=5). In some embodiments, the Edge server device may send the decryption key to the plurality of wireless devices in a manner that enables all wireless devices to receive the decryption key within two seconds of one another (i.e., N=2). In some embodiments, the processor may use radio access network QoS and synchronization techniques to have the Edge network deliver the decryption key to the plurality of wireless devices in a manner that enables all wireless devices to receive the decryption key approximately simultaneously (e.g., N<1).

Enabling delivery of decryption keys to all participating wireless devices so that all devices can decrypt the content segment so as to ensure a level playing field and prevent any users from obtaining an unfair advantage (e.g., in game play, betting, bidding or making offers, etc.) may be accomplished in a number of alternative ways.

In some embodiments, the Edge server device may send the decryption key at a predetermined time after the encrypted content segment was delivered to the plurality of wireless devices. In some embodiments, the predetermined time may be long enough after the encrypted content segment was delivered to ensure that all participating wireless devices should have received the content. By sending the decryption key to all participating wireless devices a predetermined time that is long enough to ensure that all participating wireless devices should have received the content, such embodiments ensure that the vast majority if not all participating wireless devices are able to decrypt and render the content segment at approximately the same time. Each wireless device may then decrypt the encrypted content segment using the received decryption key upon receipt. In this manner, the difference in times when the content segment is rendered on all wireless devices may be limited to the difference in time of delivering the decryption keys, which is minimized by leveraging the capabilities of the Edge computing infrastructure, plus any difference in decryption and rendering time due to differing wireless device capabilities (e.g., processor speed, graphics rendering capabilities, etc.). Thus, the term "at approximately the same time" refers to a period of time that is short enough to deny any one (i.e., first) user access to the content segment sufficiently before another (i.e., second) user to enable the first user to take an action based on the content segment before the second user can take a similar action, and thereby gain an advantage over the second user in some manner.

In some embodiments, the Edge server device may determine whether all wireless devices have received the encrypted content segment, and in response to determining that all wireless devices have received the encrypted content segment, the Edge server device may send the decryption key for the encrypted content segment from the Edge server device to the plurality of wireless devices. For example, wireless devices receiving the content segment may be directed to query an Edge server device for the decryption key, and Edge server devices may be configured to deliver the decryption key after such queries stop or slow significantly. Each wireless device may then decrypt the encrypted content segment using the received decryption key upon receipt. In this manner, the difference in times when the content segment is rendered on all wireless devices may be limited to the difference in time of delivering the decryption keys, which is minimized by leveraging the capabilities of the Edge computing infrastructure, plus any difference in decryption and rendering time due to differing wireless device capabilities.

In some embodiments, the processor may indicate to the wireless devices a future time when the decryption key will be usable by each wireless device to decrypt the encrypted content segment. In such embodiments, wireless devices may be configured to perform at least some of the decryption process within a secure zone of a processor and/or only at a time indicated in by the Edge server device in delivering the decryption key (or within the decryption key itself). In this manner, the difference in times when the content segment is rendered on all wireless devices may be limited to differences in decryption and rendering times due to differing wireless device capabilities.

In some embodiments, the various network elements may perform the method iteratively, such as for a plurality of encrypted content segments and associated decryption keys. In some embodiments, the Edge server device may receive a second decryption key for a second encrypted content segment that is or will be delivered to the plurality of wireless devices over the wireless communication network. The Edge server device may send the second decryption key for the second encrypted content segment from the Edge server device to the plurality of wireless devices after the second encrypted content segment has been received by the plurality of wireless devices in a manner that enables the plurality of wireless devices to decrypt the second encrypted content segment approximately simultaneously. Each wireless device may receive the second encrypted content segment from the wireless communication network (e.g., from a CDN server). In some embodiments, the wireless device may temporarily store the second encrypted content segment in memory, such as in a dedicated buffer memory or a portion of working memory. Each wireless device may receive the second decryption key for the second encrypted content segment from the Edge server device after receiving the second encrypted content segment. Each wireless device may decrypt the previously received (and potentially stored) second encrypted content segment using the received second decryption key. This process may be repeated continuously in a segment-by-segment basis during streaming of the content.

In some embodiments, the second encrypted content segment may include a second Instantaneous Decoder Refresh (IDR) frame. In such embodiments, the second IDR frame may be associated with the second decryption key.

In some embodiments, one or more of the wireless devices may transmit a bet or a wager (referred to herein as a "wager") to a betting system server. In some embodiments, the wireless device may transmit the wager in anticipation of a future event in or related to the subject matter of the content stream. In some embodiments, the betting system server may be configured to reject a wager on an event in the content stream that occurs during the encrypted content segment. In some embodiments, the encrypted content segment may include a stop time, and the betting system server may be configured to reject a wager on an event in the content stream that occurs before the stop time of the encrypted content segment. The stop time may be an indication of a time or timing of events in the content stream, and the betting system server may be configured to reject wagers on events in the content stream that occur before or earlier than the stop time. In some embodiments, the betting system may receive the stop time from one or more of the media server, the encrypter function, and the CDN server.

FIG. 1A is a system block diagram illustrating an example communications system 100. The communications system 100 may be a 5G New Radio (NR) network, or any other suitable network such as a Long Term Evolution (LTE) network. While FIG. 1A illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of wireless devices (illustrated as wireless devices 120a-120e in FIG. 1). The communications system 100 may include an Edge network 142 provide network computing resources in proximity to the mobile devices. The communications system 100 also may include a number of base stations (illustrated as the BS 110a, the BS 110b, the BS 110c, and the BS 110d) and other network entities. A base station is an entity that communicates with wireless devices, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type core network, such as an LTE core network (e.g., an Evolved Packet Core (EPC) network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120*a*-120*e* may communicate with the base station 110*a*-110*d* over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110*d*). A relay station is an entity that can receive a transmission of data from an upstream station (for example, a base station or a wireless device) and send a transmission of the data to a downstream station (for example, a wireless device or a base station). A relay station also may be a wireless device that can relay transmissions for other wireless devices. In the example illustrated in FIG. 1, a relay station 110*d* may communicate with macro the base station 110*a* and the wireless device 120*d* in order to facilitate communication between the base station 110*a* and the wireless device 120*d*. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120*a*, 120*b*, 120*c* may be dispersed throughout communications system 100, and each wireless device may be stationary or mobile. A wireless device also may be referred to as an access terminal, a terminal, a mobile station, a subscriber unit, a station, user equipment (UE), etc.

A macro base station 110*a* may communicate with the communication network 140 over a wired or wireless communication link 126. The wireless devices 120*a*, 120*b*, 120*c* may communicate with a base station 110*a*-110*d* over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to 2 streams per wireless device may be supported.

Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things)

devices. The wireless device 120a-120e may be included inside a housing that houses components of the wireless device 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some implementations, two or more wireless devices (for example, illustrated as the wireless device 120a and the wireless device 120e) may communicate directly using one or more sidelink channels (for example, without using a base station 110a-d as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a-110d.

Figure 1B:
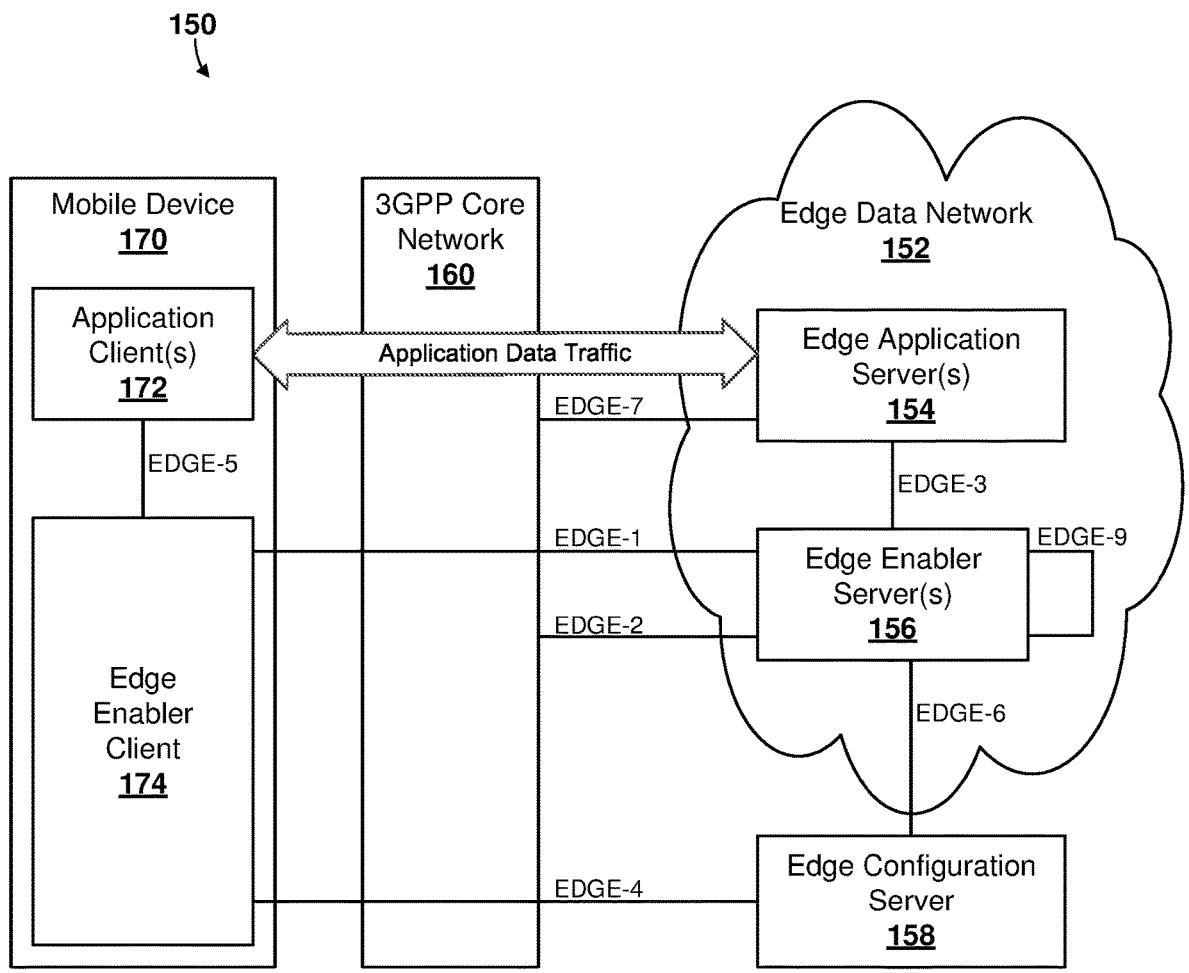
FIG. 1B is a system block diagram illustrating an example Edge computing system suitable for use with various embodiments.

FIG. 1B is a system block diagram illustrating an example Edge computing system 150 suitable for use with various embodiments. In some embodiments, Edge computing system 150 may include an Edge data network 152 and a mobile device 170 configured to communicate via a 3GPP core network 160. The Edge data network 152 may include an Edge application server 154 and one or more Edge enabler server(s) 156, in communication with an Edge configuration server 158. The mobile device 170 may include an application client(s) 172 in communication with one or more Edge enabler client(s) 174. Each of the elements of the Edge computing system 150 may communicate over an Edge interface (e.g., EDGE-1, EDGE-2, . . . EDGE-9).

The Edge application server 154 and the application client(s) 172 each may be configured to process computing tasks, and may communicate application data traffic (i.e., data related to a computing task) via the 3GPP core network 160. The Edge enabler server(s) 156 may be configured to maintain and advertise (e.g., to devices such as the mobile device 170) applications provided by the Edge application server(s) 154. The Edge configuration server 158 may be configured to manage communication within and among one or more Edge data networks 152.

The Edge application server(s) 154 may provide information about its applications and their capabilities to the Edge enabler server(s) 156 via the EDGE-3 interface. The Edge enabler server(s) 156 may provide information about the Edge data network 152 to the Edge configuration server 158 via the EDGE-6 interface. The Edge application server(s) 154 and the Edge enabler server(s) 156 may communicate with the 3GPP core network 160 via the EDGE-7 interface and the EDGE-2 interface, respectively.

In some embodiments, the Edge enabler client(s) 174 may obtain information about the available Edge data networks 152 from the Edge enabler server(s) 156 via the EDGE-1 interface (and/or from the Edge configuration server 158 via the EDGE-4 interface). In some embodiments, the Edge enabler client(s) 174 may obtain information about Edge application server(s) 154 such as available applications and their capabilities via the EDGE-4 interface. In some embodiments, the Edge enabler client 174, the Edge enabler server(s) 156, and the Edge configuration server 158 may employ a discovery and provisioning procedure via their respective Edge interfaces.

The application client 172 may communicate with the Edge enabler client(s) 174 via the EDGE-5 interface. In some embodiments, the Edge enabler client(s) 174 may obtain information about available Edge data networks 152 from the Edge configuration server 158 via the EDGE-4 interface, and may coordinate the use of the Edge application server(s) 154 with the Edge enabler server(s) 156 via the EDGE-1 interface. The Edge enabler server(s) 156 may coordinate with one another via the EDGE-9 interface.

Figure 2:
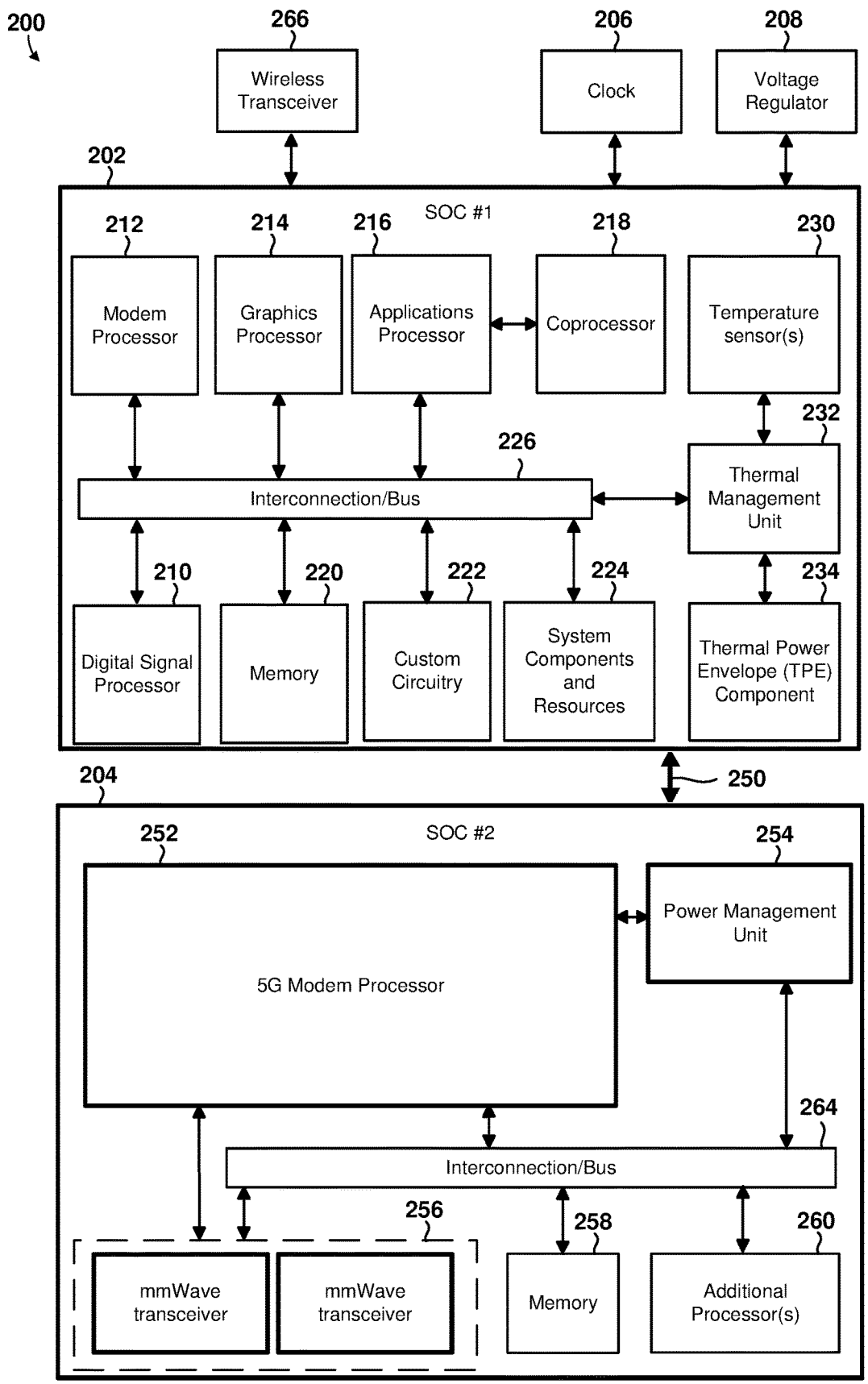
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from wireless devices, such as a base station 110a. In some implementations, the first SOC 202 may operate as central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
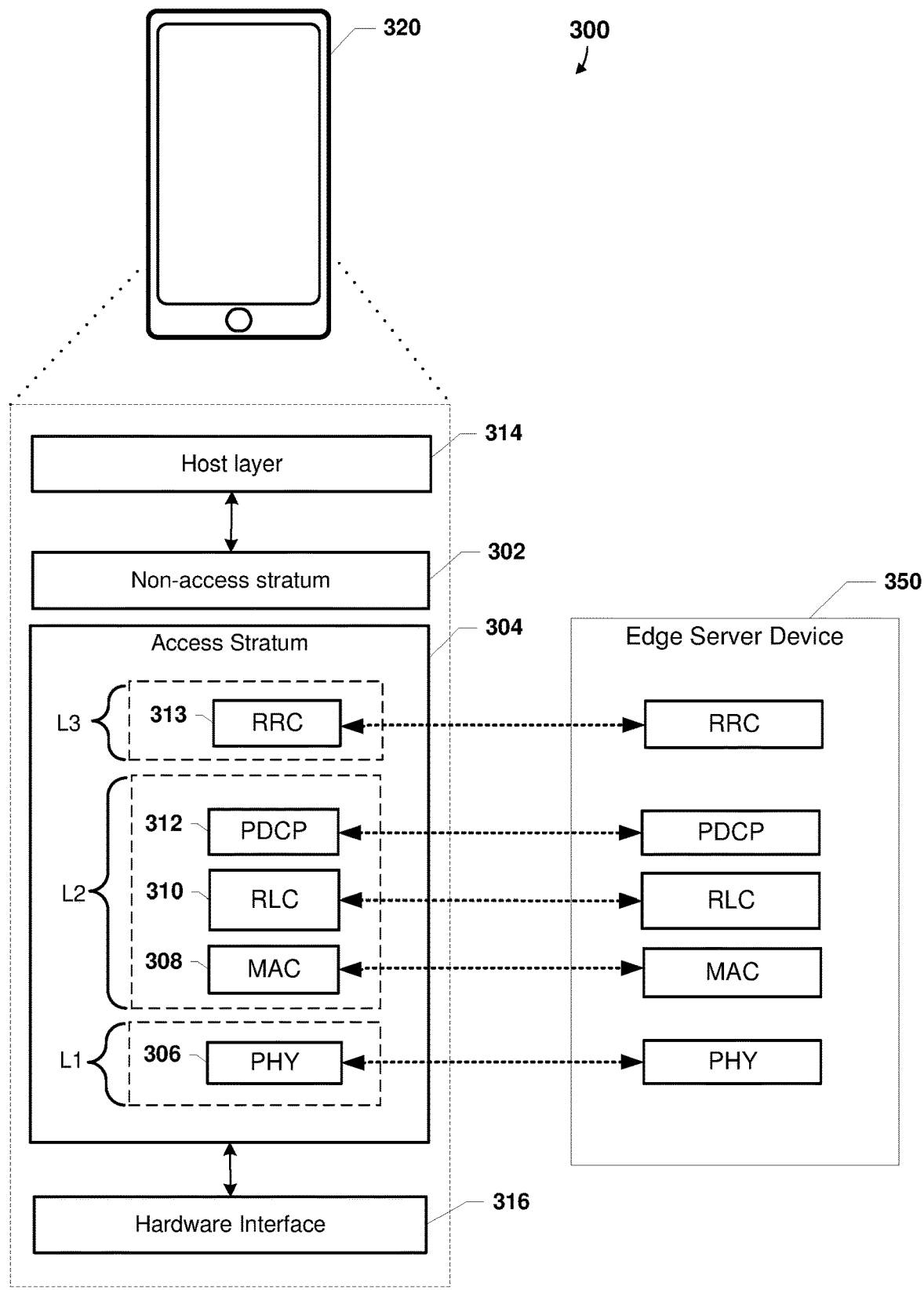
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and an Edge server device 350 (e.g., in the Edge network 412, 150) of a communication system (e.g., 100). In various embodiments, layers in software architecture 300 may form logical connections with corresponding layers in software of the Edge server device 350.

The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the Edge server device 350 over the physical layer 306. In some implementations, Layer 2 may include a media access control (MAC) sublayer 308, a radio link control (RLC) sublayer 310, and a packet data convergence protocol (PDCP) 312 sublayer, each of which form logical connections terminating at the Edge server device 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the wireless device 320 and the Edge server device 350.

In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as Internet protocol (IP) layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4A:
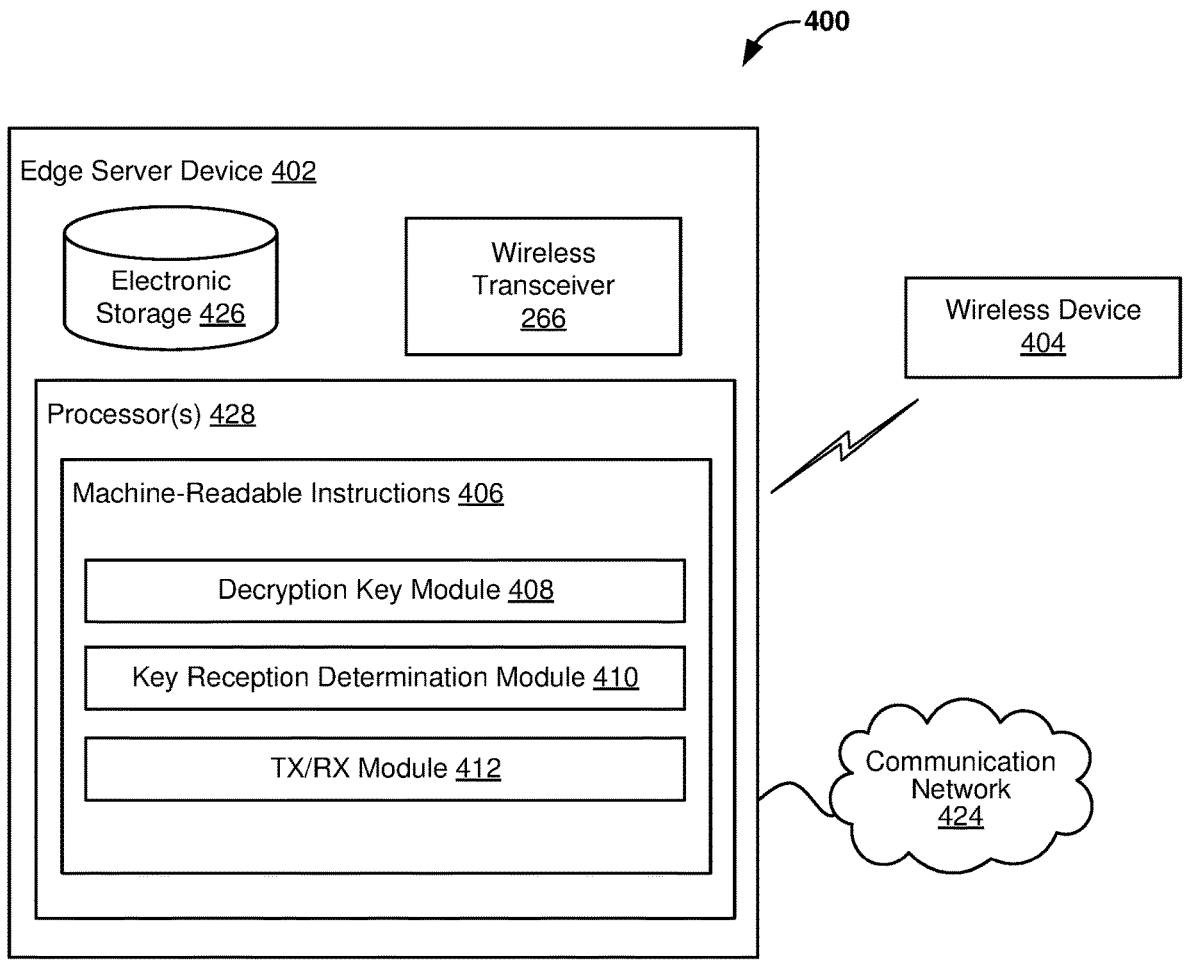
FIGS. 4A and 4B are component block diagrams illustrating a system configured for enhancing coverage for initial access accordance with various embodiments.
Figure 4B:
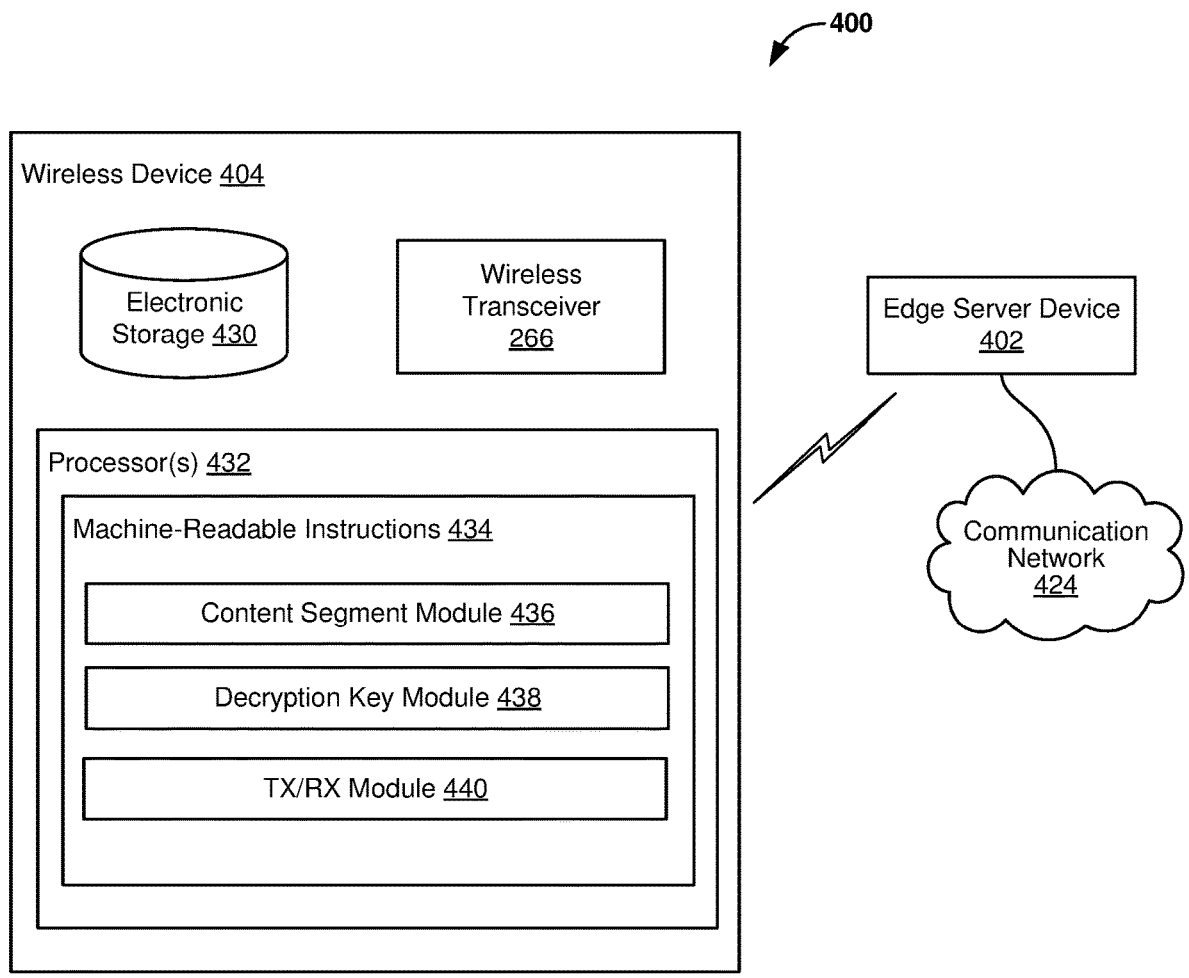

FIGS. 4A and 4B are component block diagrams illustrating a system 400 configured for enhancing coverage for initial access accordance with various embodiments. With reference to FIGS. 1-4B, system 400 may include an Edge server device 402 and a wireless device 404 (e.g., 110a-110d, 120a-120e, 200, 320, 350). The Edge server device 402 and the wireless device 404 exchange wireless communications in order to establish a wireless communication link 122, 124, 126.

The Edge server device 402 and the wireless device 404 may include one or more processors 428, 432 coupled to electronic storage 426, 430 and a wireless transceiver (e.g., 266). In the Edge server device 402 and the wireless device 404, the wireless transceiver 266 may be configured to receive messages sent in transmissions and pass such message to the processor(s) 428, 432 for processing. Similarly, the processor 428, 432 may be configured to send messages for transmission to the wireless transceiver 266 for transmission.

Referring to the Edge server device 402, the processor(s) 428 may be configured by machine-readable instructions 406. Machine-readable instructions 406 may include one or more instruction modules. The instruction modules may include computer program modules. The instruction modules may include one or more of a decryption key module 408, a key reception determination module 410, and a transmit/receive (TX/RX) module 412, and/or other instruction modules.

The decryption key module 408 may be configured to receive a decryption key for an encrypted content segment that is or will be delivered to a plurality of wireless devices over the wireless communication network. The decryption key module 408 may be configured send the decryption key for the encrypted content segment from the Edge server device to the plurality of wireless devices after the encrypted content segment has been received by the plurality of wireless devices in a manner that enables the plurality of wireless devices to decrypt the encrypted content segment approximately simultaneously.

The key reception determination module 410 may be configured to determine whether all wireless devices have received an encrypted content segment.

The transmit/receive (TX/RX) module 416 may be configured to control the transmission and reception of wireless communications with the wireless device 404, e.g., via the wireless transceiver 266.

Referring to the wireless device 404, the processor(s) 432 may be configured by machine-readable instructions 434. Machine-readable instructions 406 may include one or more instruction modules. The instruction modules may include computer program modules. The instruction modules may include one or more of a content segment module 436, a decryption key module 438, a TX/RX module 440, and/or other instruction modules.

The content segment module 436 may be configured to receive an encrypted content segment from the wireless communication network. In some embodiments, the content segment module 436 may be configured to temporarily store the encrypted content segment in memory, such as a buffer or other temporary memory.

The decryption key module 438 may be configured to receive a decryption key for the encrypted content segment from an Edge server device. In some embodiments, the decryption key module 438 may receive the decryption key after receiving the encrypted content segment. The decryption key module 438 may be configured to decrypt the received encrypted content segment using the received decryption key.

The TX/RX module 440 may be configured to enable communications with the Edge server device 402, e.g., via the wireless transceiver 266.

In some embodiments, the Edge server device 402 and the wireless device 404 may be operatively linked via one or more wireless communication links (e.g., wireless communication link 122, 124, 126). It will be appreciated that this is not intended to be limiting, and that the scope of this disclosure includes embodiments in which the Edge server device 402 and the wireless device 404 may be operatively linked via some other communication medium.

The electronic storage 426, 430 may include non-transitory storage media that electronically stores information. The electronic storage media of electronic storage 426, 430 may include one or both of system storage that is provided integrally (i.e., substantially non-removable) with the Edge server device 402 and the wireless device 404 and/or removable storage that is removably connectable to the Edge server device 402 and the wireless device 404 via, for example, a port (e.g., a universal serial bus (USB) port, a firewire port, etc.) or a drive (e.g., a disk drive, etc.). Electronic storage 426, 430 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426, 430 may include one or more virtual storage resources (e.g., cloud storage, a virtual private network, and/or other virtual storage resources). Electronic storage 426, 430 may store software algorithms, information determined by processor(s) 428, 432, information received from the Edge server device 402 and the wireless device 404, or other information that enables the Edge server device 402 and the wireless device 404 to function as described herein.

Processor(s) 428, 432 may be configured to provide information processing capabilities in the Edge server device 402 and the wireless device 404. As such, the processor(s) 428, 432 may include one or more of a digital processor, an analog processor, a digital circuit designed to process information, an analog circuit designed to process information, a state machine, and/or other mechanisms for electronically processing information. Although the processor(s) 428, 432 are illustrated as single entities, this is for illustrative purposes only. In some embodiments, the processor(s) 428, 432 may include a plurality of processing units and/or processor cores. The processing units may be physically located within the same device, or processor(s) 428, 432 may represent processing functionality of a plurality of devices operating in coordination. The processor(s) 428, 432 may be configured to execute modules 408-412 and modules 436-440 and/or other modules by software; hardware; firmware; some combination of software, hardware, and/or firmware; and/or other mechanisms for configuring processing capabilities on processor(s) 428, 432. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-412 and modules 436-440 described below is for illustrative purposes, and is not intended to be limiting, as any of modules 408-412 and modules 436-440 may provide more or less functionality than is described. For example, one or more of the modules 408-412 and modules 436-440 may be eliminated, and some or all of its functionality may be provided by other modules 408-412 and modules 436-440. As another example, the processor(s) 428, 432 may be configured to execute one or more additional modules that may perform some or all of the functionality attributed below to one of the modules 408-412 and modules 436-440.

Figure 5:
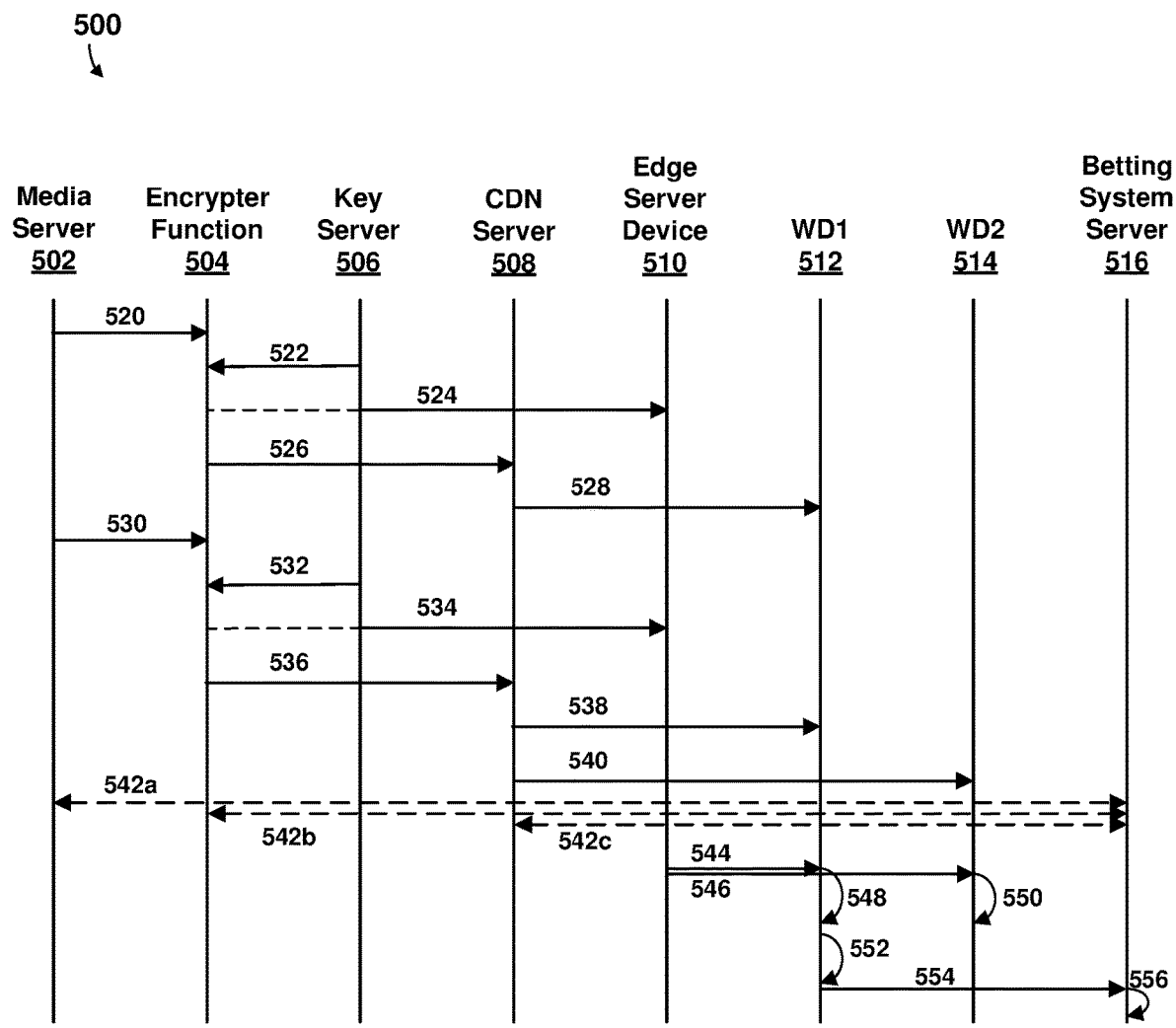
FIG. 5 is a message flow diagram illustrating communications exchanged between various network elements including an Edge server device and wireless devices during the method for synchronous presentation of content delivered over a wireless communication network according to various embodiments.

FIG. 5 is a message flow diagram illustrating communications exchanged between various network elements including an Edge server device and wireless devices during a method 500 for synchronous presentation of content delivered over a wireless communication network. With reference to FIGS. 1-5, in some embodiments, a media server 502, an encrypter function 504, a key server 506, a CDN server 508, and Edge server device 510, a first wireless device (WD1) 512, a second wireless device (WD2) 515, and a betting system server 516 may communicate over a wireless communication network, aspects of which are described above with respect to FIGS. 1A and 1B.

The media server 502 may send a content segment 520 to the encrypter function 504. The content segment 520 may be a content segment of a content stream. The encrypter function 504 may obtain from the key server 506 a key in a message 522 for use in encrypting the content segment 502. The key server 506 also may send the key in a message 524 to the Edge server device 510. Optionally, in some embodiments, the encrypter function 504 may send the key to the Edge server device 510.

The encrypter function 504 may send an encrypted content segment in a message 526 to the CDN server 508. The CDN server 508 may send the encrypted content segment in a message 528 to the first wireless device (WD1) 512.

The media server 502 may send a second content segment 530 of the content stream to the encrypter function 504. The encrypter function 504 may obtain from the key server 506 a second key in a message 532 for use in encrypting the second content segment 530. The key server 506 also may send the second key in a message 534 to the Edge server device 510. Optionally, in some embodiments, the encrypter function 504 may send the second key to the Edge server device 510.

The encrypter function 504 may send a second encrypted content segment in a message 536 to the CDN server 508. The CDN server 508 may send the second encrypted content segment in a message 538 to the first wireless device (WD1) 512.

The CDN server 508 may send the encrypted content segment (i.e., the first encrypted content segment) in a message 540 to the second wireless device (WD2) 514.

In some embodiments, the betting server system 516 may communicate with the media server 502 (via communication 542a), the encrypter function 504 (via communication 542b), and/or the CDN server 508 (via communication 542c). In some embodiments, the betting server system 516 may receive an indication of the content encoded in the first encrypted content segment and/or the second encrypted content segment. In some embodiments, the betting server system 516 may receive a stop time associated with (e.g., encoded in) the first encrypted content segment and/or the second encrypted content segment.

The Edge server device 510 may send the key associated with the (first) encrypted content segment (e.g., a decryption key) to the first wireless device 512 in a message 544. The Edge server device 510 may send the key associated with the (first) encrypted content segment to the second wireless device 514 in a message 546.

The first wireless device 512 may decrypt 548 the encrypted content using the decryption key, and the second wireless device may decrypt 550 the encrypted content using the decryption key. In various embodiments, the first wireless device 512 and the second wireless device may decrypt the encrypted content segment approximately simultaneously.

In some embodiments, the first wireless device 512 may receive a user input 552 indicating a wager on an event in the content stream. The first wireless device 512 may transmit a message 554 to the betting system server 516 indicating the wager.

In some embodiments, the betting server system 516 may determine 556 whether to accept or reject the wager. In some embodiments, the betting system server 516 may be configured to reject a wager on an event in the content stream that occurs during the encrypted content segment. In some embodiments, the encrypted content segment may include a stop time, and the betting system server 516 may be configured to reject a wager on an event in the content stream that occurs before the stop time of the encrypted content segment. For example, the stop time may be an indication of a time or timing of events in the content stream, and the betting system server 516 may be configured to reject wagers on events in the content stream that occur before or earlier than the stop time. In some embodiments, the betting system server 516 may receive the stop time from one or more of the media server 502, the encrypter function 504, and the CDN server 508, e.g., via one or more of the communications 542a-542c. For example, some wireless devices may be able to decode content faster than other wireless devices because of superior device capabilities (e.g., a fast processor, fast image rendering, etc.). To reduce or remove an unfair advantage, such as a betting advantage in a wireless betting service, that such a wireless device may have because of its superior processing capabilities, a stop time included in the encrypted content segment may indicate a portion of the content stream that is decodable using currently-distributed key(s) (e.g., the encrypted content segment). For example, in some embodiments, to maintain fairness for all participating wireless devices, a betting server system 516 may be configured to reject wagers on events in any currently-decodable content (i.e., content that a wireless device can decode and present because a key for that content has been distributed to the wireless device).

Figure 6A:
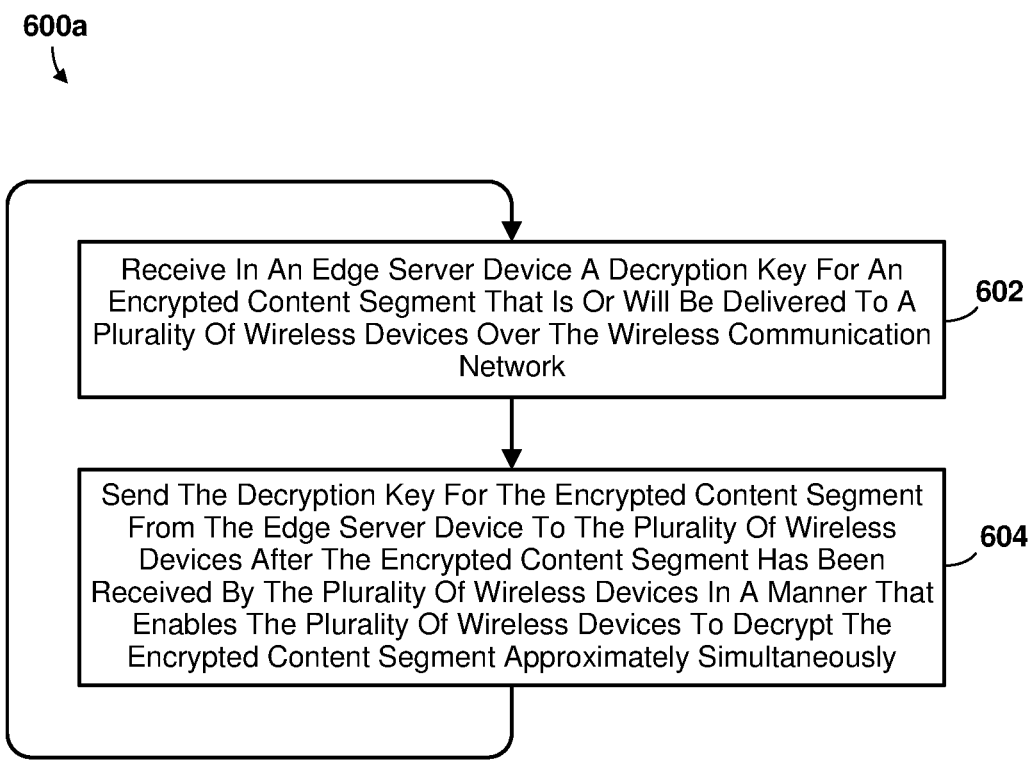
FIG. 6A is a process flow diagram illustrating a method performed by a processor of an Edge server device for synchronous presentation of content delivered over a wireless communication network according to various embodiments.

FIG. 6A is a process flow diagram illustrating a method 600a performed by a processor of an Edge server device for synchronous presentation of content delivered over a wireless communication network according to various embodiments. With reference to FIGS. 1-6A, the operations of the method 600a may be performed by a processor (such as the processor 210, 212, 214, 216, 218, 252, 260, 428) of an Edge server device (such as the Edge server device 200, 350, 402, 510).

In block 602, the processor may receive a decryption key for an encrypted content segment that is or will be delivered to a plurality of wireless devices over the wireless communication network. Means for performing functions of the operations in block 602 may include the processor (e.g., 210, 212, 214, 216, 218, 252, 260, 428) and the wireless transceiver (e.g., 266).

In block 604, the processor may send the decryption key for the encrypted content segment from the Edge server device to the plurality of wireless devices after the encrypted content segment has been received by the plurality of wireless devices in a manner that enables the plurality of wireless devices to decrypt the encrypted content segment approximately simultaneously. In some embodiments, the processor may send the decryption key in a manner that enables the plurality of wireless devices to decrypt the encrypted content segment within five seconds or less of one another. In some embodiments, the processor may send the decryption key in a manner that enables the plurality of wireless devices to decrypt the encrypted content segment within two seconds of one another. In some embodiments, the processor may send the decryption key to the plurality of wireless devices in a manner that enables the plurality of wireless devices to receive the decryption key within five seconds or less of one another. In some embodiments, the processor may send the decryption key to the plurality of wireless devices in a manner that enables the plurality of wireless devices to receive the decryption key within two seconds or less of one another. In some embodiments, the processor may use radio access network QoS and synchronization techniques to have the Edge server deliver the decryption key to the plurality of wireless devices in a manner that enables all wireless devices to receive the decryption key approximately simultaneously. In some embodiments, the processor may send the decryption key at a predetermined time after the encrypted content segment was delivered to the plurality of wireless devices. In some embodiments, the processor may indicate a future time when the decryption key will be usable by the plurality of wireless devices to decrypt the encrypted content segment. Means for performing functions of the operations in block 604 may include the processor (e.g., 210, 212, 214, 216, 218, 252, 260, 428) and the wireless transceiver (e.g., 266).

The processor may repeat the operations of block 602 and 604 continuously throughout the duration of a content streaming session, repeatedly sending decryption keys (e.g., a second encryption key, etc.) for each encrypted content segment (e.g., a second encrypted content segment, etc.) to the plurality of wireless device. In this manner, the delivery of decryption keys by Edge server device enables the plurality of wireless devices to decrypt each encrypted content segment within a content stream approximately simultaneously.

Figure 6B:
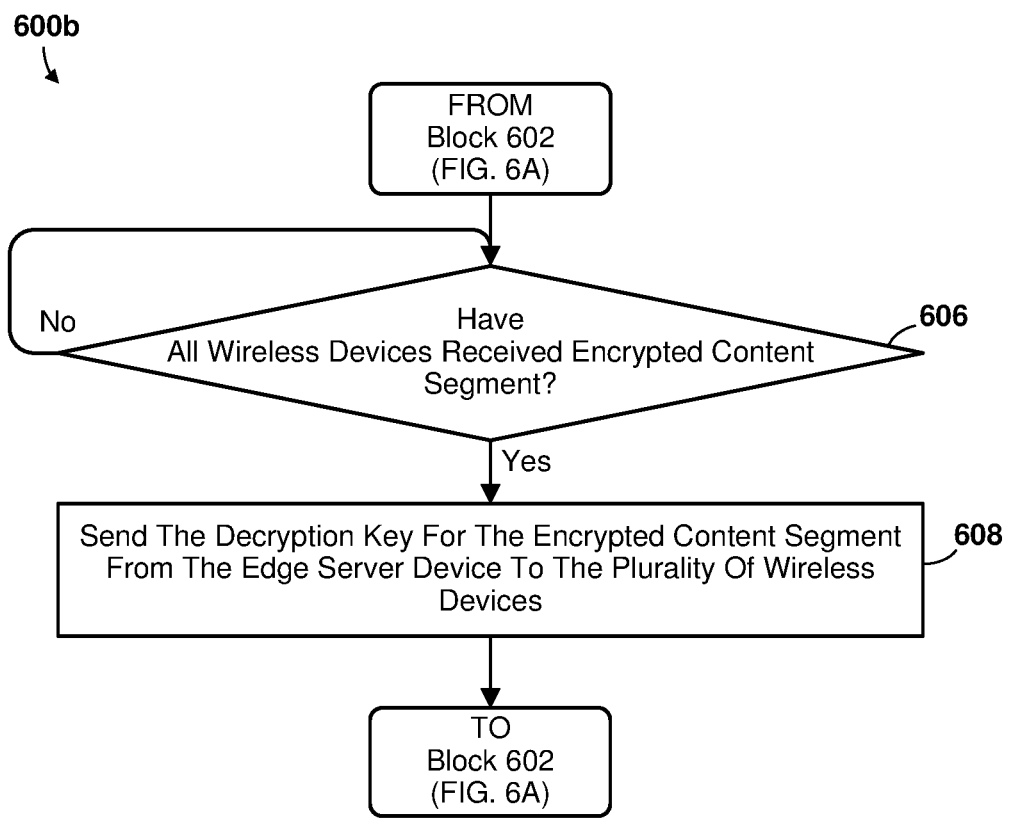
FIGS. 6B and 6C illustrate operations that may be performed as part of the method for synchronous presentation of content delivered over a wireless communication network according to various embodiments.
Figure 6C:
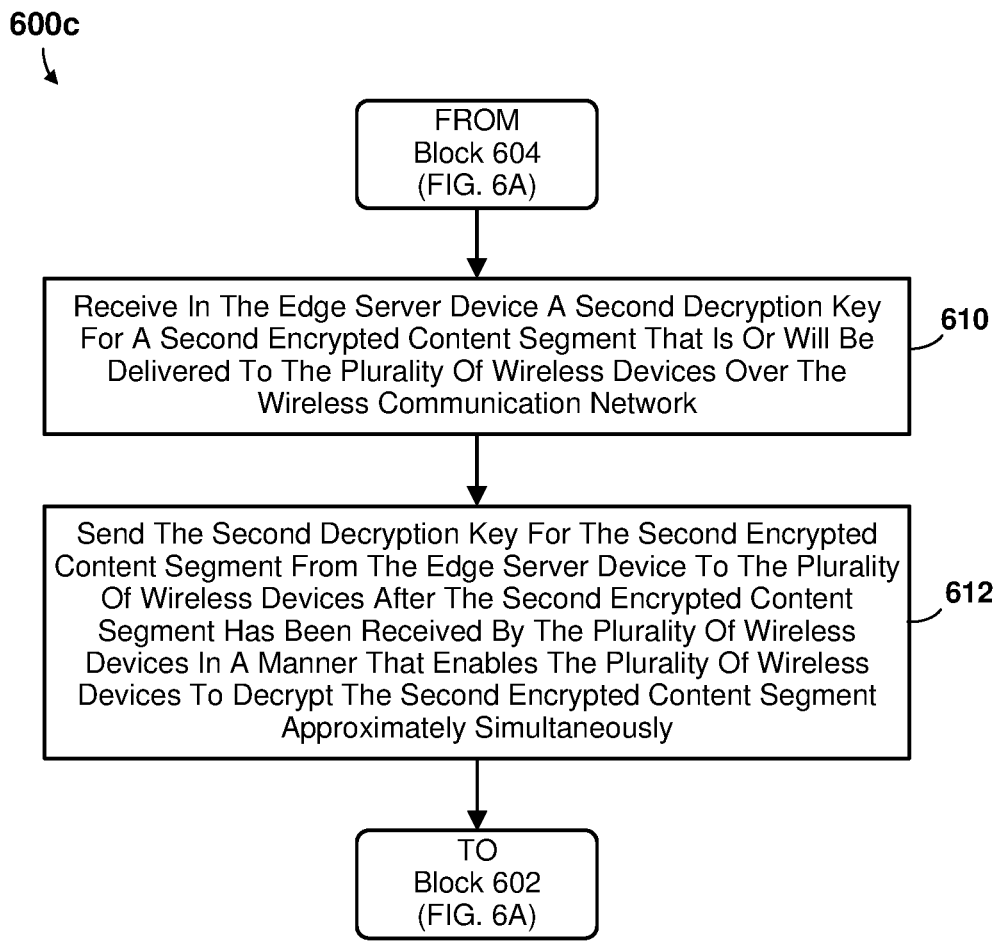

FIGS. 6B and 6C illustrate operations 600b and 600c that may be performed as part of the method 600a for enhancing coverage for initial access according to various embodiments. With reference to FIGS. 1-6C, the operations 600b and 600c may be performed by a processor (such as the processor 210, 212, 214, 216, 218, 252, 260, 428) of an Edge server device (such as the Edge server device 200, 350, 402, 510).

Referring to FIG. 6B, following performance of the operations of block 602 of the method 600a (FIG. 6A), the processor may determine whether all wireless devices have received the encrypted content segment in determination block 606. For example, wireless devices receiving the content segment may be directed to query an Edge server device for the decryption key, and Edge server devices may be configured to deliver the decryption key after such queries stop or slow significantly (e.g., drop below a threshold, such as a number of queries-per-unit of time). Means for performing functions of the operations in determination block 606 may include the processor (e.g., 210, 212, 214, 216, 218, 252, 260, 428).

In response to determining that all wireless devices have not received the encrypted content segment (i.e., determination block 606="No"), the processor may repeat the operations of determination block 606. In some embodiments, the processor may wait for a period of time before repeating the operations of determination block 606.

In response to determining that all wireless devices have received the encrypted content segment (i.e., determination block 606="Yes"), the processor may send the decryption key for the encrypted content segment from the Edge server device to the plurality of wireless devices in block 608. Means for performing functions of the operations in block 608 may include the processor (e.g., 210, 212, 214, 216, 218, 252, 260, 428) and the wireless transceiver (e.g., 266).

The processor may then perform the operations of block 602 of the method 600a as described.

Referring to FIG. 6B, following the performance of the operations of block 604 of the method 600a, the processor may receive a second decryption key for a second encrypted content segment that is or will be delivered to the plurality of wireless devices over the wireless communication network in block 610. Means for performing functions of the operations in block 610 may include the processor (e.g., 210, 212, 214, 216, 218, 252, 260, 428) and the wireless transceiver (e.g., 266).

In block 612, the processor may send the second decryption key for the second encrypted content segment from the Edge server device to the plurality of wireless devices after the second encrypted content segment has been received by the plurality of wireless devices in a manner that enables the plurality of wireless devices to decrypt the second encrypted content segment approximately simultaneously. Means for performing functions of the operations in block 612 may include the processor (e.g., 210, 212, 214, 216, 218, 252, 260, 428) and the wireless transceiver (e.g., 266).

The processor may then perform the operations of block 602 of the method 600 (FIG. 6A) as described.

Figure 7A:
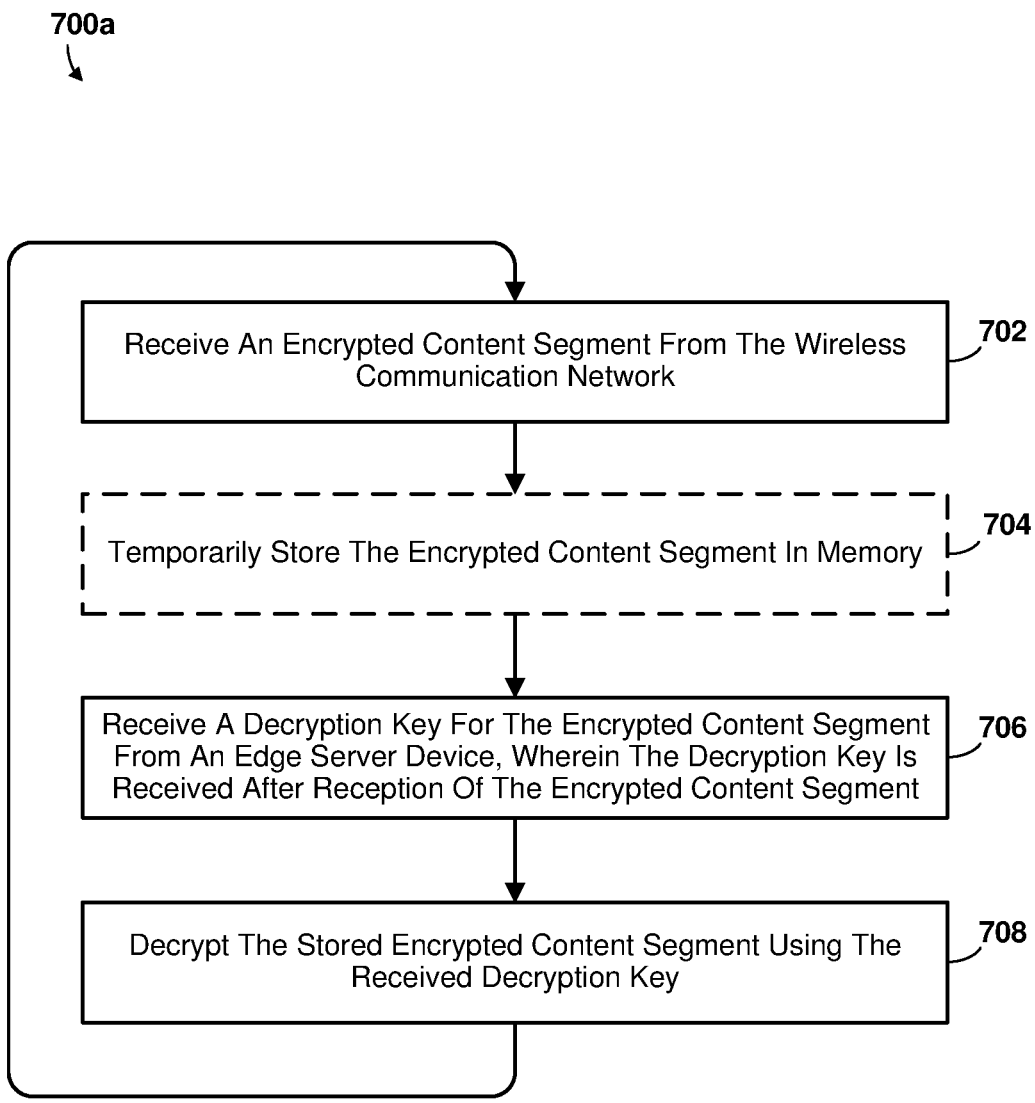
FIG. 7A is a process flow diagram illustrating a method performed by a processor of a wireless device for receiving content over a wireless communication network and rendering the content within a time window according to various embodiments.

FIG. 7A is a process flow diagram illustrating a method 700a performed by a processor of a wireless device for receiving content over a wireless communication network and rendering the content within a time window according to various embodiments. With reference to FIGS. 1-7A, the operations of the method 700*a* may be performed by a processor (such as the processor 210, 212, 214, 216, 218, 252, 260, 432) of a wireless device (such as the wireless device 120*a*-120*e*, 200, 320, 404, 512, 514).

In block 702, the processor may receive an encrypted content segment from the wireless communication network. Means for performing functions of the operations in block 702 may include the processor (e.g., 210, 212, 214, 216, 218, 252, 260, 432) and the wireless transceiver (e.g., 266).

In optional block 704, the processor may temporarily store the encrypted content segment in memory, such as in a buffer or other temporary memory (e.g., 258, 430). Temporarily storing the encrypted content segment, such as in a content buffer, enables all participating wireless devices to receive each content segment before corresponding decryption keys are delivered by Edge server devices, particularly in situations in which transmissions of the encrypted content cannot be synchronized or completed to all participating wireless devices approximately simultaneously. Means for performing functions of the operations in block 704 may include the processor (e.g., 210, 212, 214, 216, 218, 252, 260, 432).

In block 706, the processor may receive a decryption key for the encrypted content segment from an Edge server device. Receiving the decryption key after reception of the encrypted content segment enables all participating wireless devices to acquire the ability to decrypt a corresponding encrypted content segment at approximately the same time. Means for performing functions of the operations in block 706 may include the processor (e.g., 210, 212, 214, 216, 218, 252, 260, 432) and the wireless transceiver (e.g., 266).

In block 708, the processor may decrypt the received encrypted content segment using the received decryption key to render a decrypted content segment. In some embodiments, the processor may decrypt the received (and possibly stored) encrypted content segment upon receipt of the decryption key. In some embodiments, the processor may decrypt the received (and possibly stored) encrypted content segment at a time indicated by the Edge server device. In some embodiments, the processor may decrypt the received (and possibly stored) encrypted content segment in a secure zone of the wireless device. Means for performing functions of the operations in block 708 may include the processor (e.g., 210, 212, 214, 216, 218, 252, 260, 432).

The processor may repeat the operations of block 702-708 from time to time, to enable the wireless device to receive decryption keys (e.g., a second encryption key, etc.) for additional encrypted content segments (e.g., a second encrypted content segment, etc.) in a manner that enables each wireless device to decrypt each of the subsequent encrypted content segments approximately simultaneously.

Figure 7B:
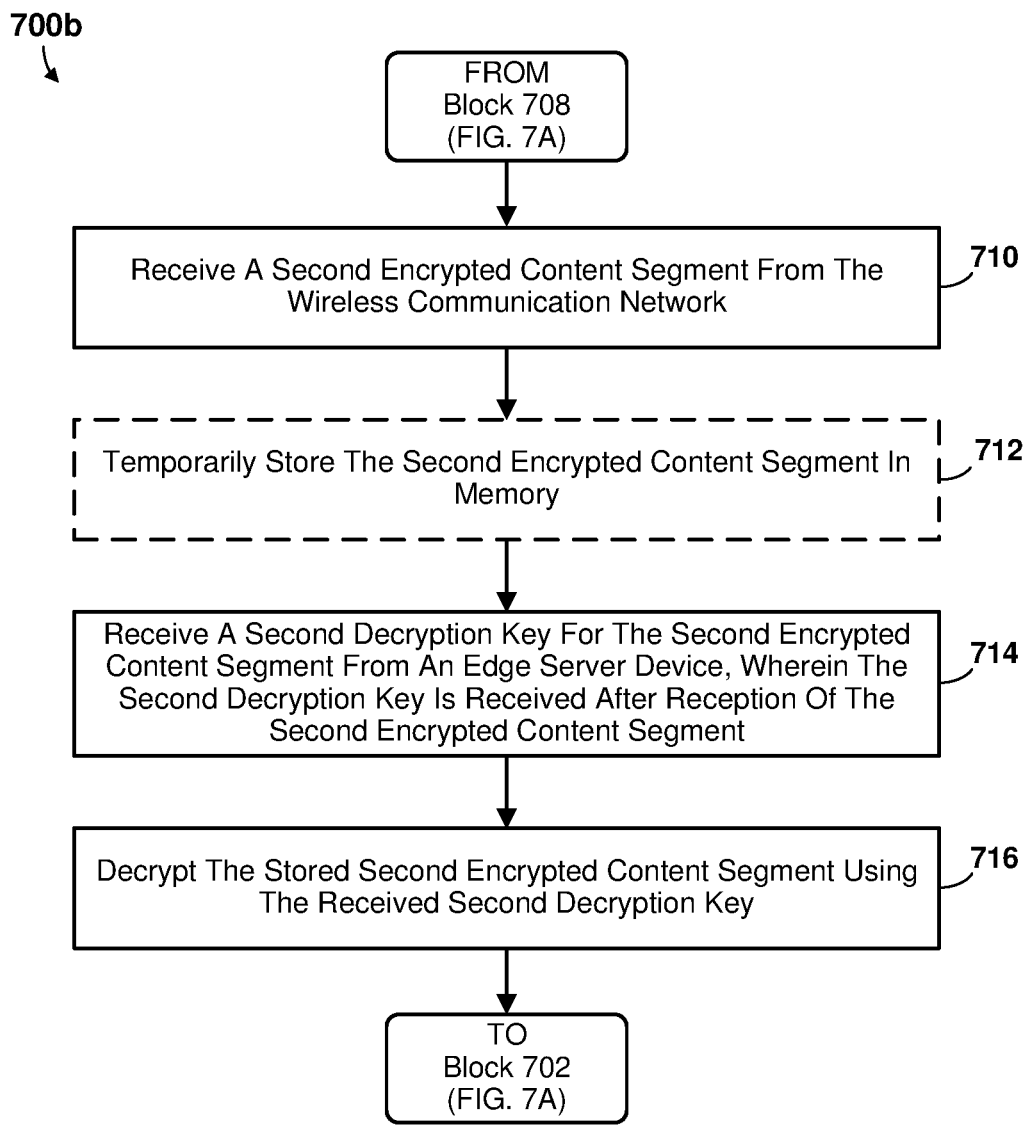
FIGS. 7B and 7C illustrate operations that may be performed as part of the method for receiving content over a wireless communication network and rendering the content within a time window according to various embodiments.
Figure 7C:
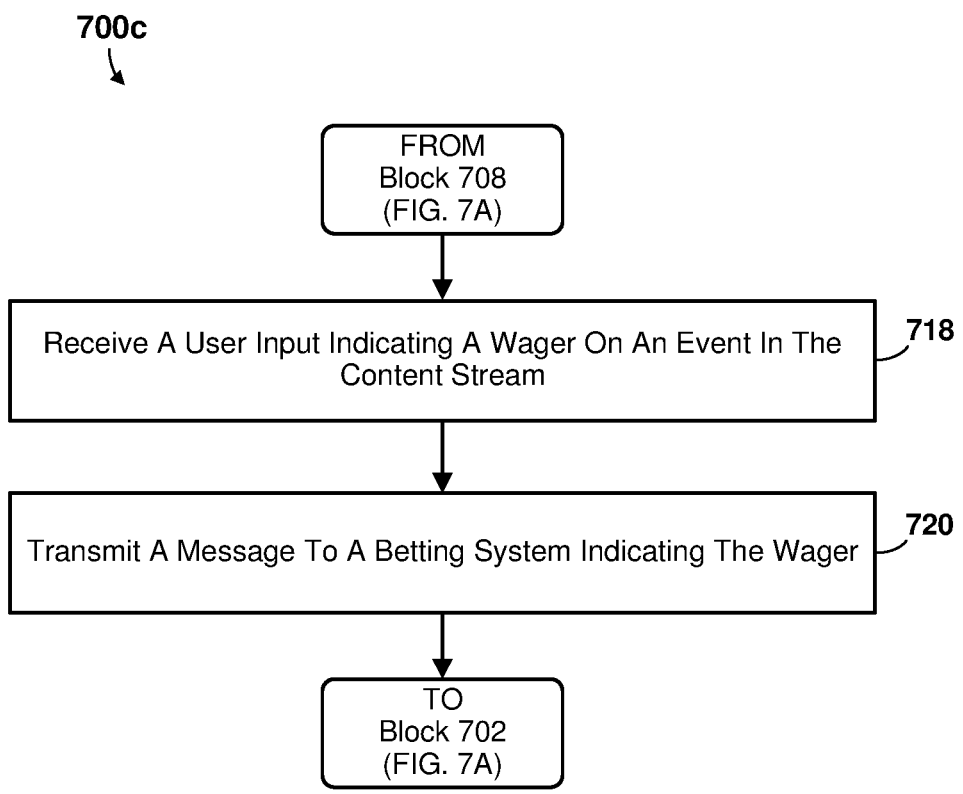

FIGS. 7B and 7C illustrate operations 700*b* and 700*c* that may be performed as part of the method 700*a* for receiving content over a wireless communication network and rendering the content within a time window in accordance with various embodiments. With reference to FIGS. 1-7C, the operations 700*b* and 700*c* may be performed by a processor (such as the processor 210, 212, 214, 216, 218, 252, 260, 432) of a wireless device (such as the wireless device 120*a*-120*e*, 200, 320, 404, 512, 514).

Referring to FIG. 7B, following performance of the operations of block 708 (FIG. 7A), the processor may receive a second encrypted content segment from the wireless communication network in block 710. Means for performing functions of the operations in block 710 may include the processor (e.g., 210, 212, 214, 216, 218, 252, 260, 432) and the wireless transceiver (e.g., 266).

In optional block 712, the processor may temporarily store the second encrypted content segment in memory. Means for performing functions of the operations in block 712 may include the processor (e.g., 210, 212, 214, 216, 218, 252, 260, 432).

In block 714, the processor may receive a second decryption key for the second encrypted content segment from an Edge server device, wherein the second decryption key is received after reception of the second encrypted content segment. Means for performing functions of the operations in block 714 may include the processor (e.g., 210, 212, 214, 216, 218, 252, 260, 432) and the wireless transceiver (e.g., 266).

In block 716, the processor may decrypt the received (and possibly stored) second encrypted content segment using the received second decryption key. Means for performing functions of the operations in block 716 may include the processor (e.g., 210, 212, 214, 216, 218, 252, 260, 432).

The processor may then perform the operations of block 702 of the method (FIG. 7A) as described.

Referring to FIG. 7C, following performance of the operations of block 708 (FIG. 7A), the processor may receive a user input indicating a wager on an event in the content stream in block 718. The user input may be received after the decrypted content segment is rendered, as various embodiments permit rendering decrypted content segments on a plurality of wireless devices within a duration brief ensure no users has an unfair advantage by viewing the decrypted content segment before others. Means for performing functions of the operations in block 718 may include the processor (e.g., 210, 212, 214, 216, 218, 252, 260, 432) and the wireless transceiver (e.g., 266).

In block 720, the processor may transmit a message to a betting system indicating the wager. Means for performing functions of the operations in block 720 may include the processor (e.g., 210, 212, 214, 216, 218, 252, 260, 432) and the wireless transceiver (e.g., 266).

The processor may then perform the operations of block 702 of the method 700*a* (FIG. 7A) as described.

Figure 8:
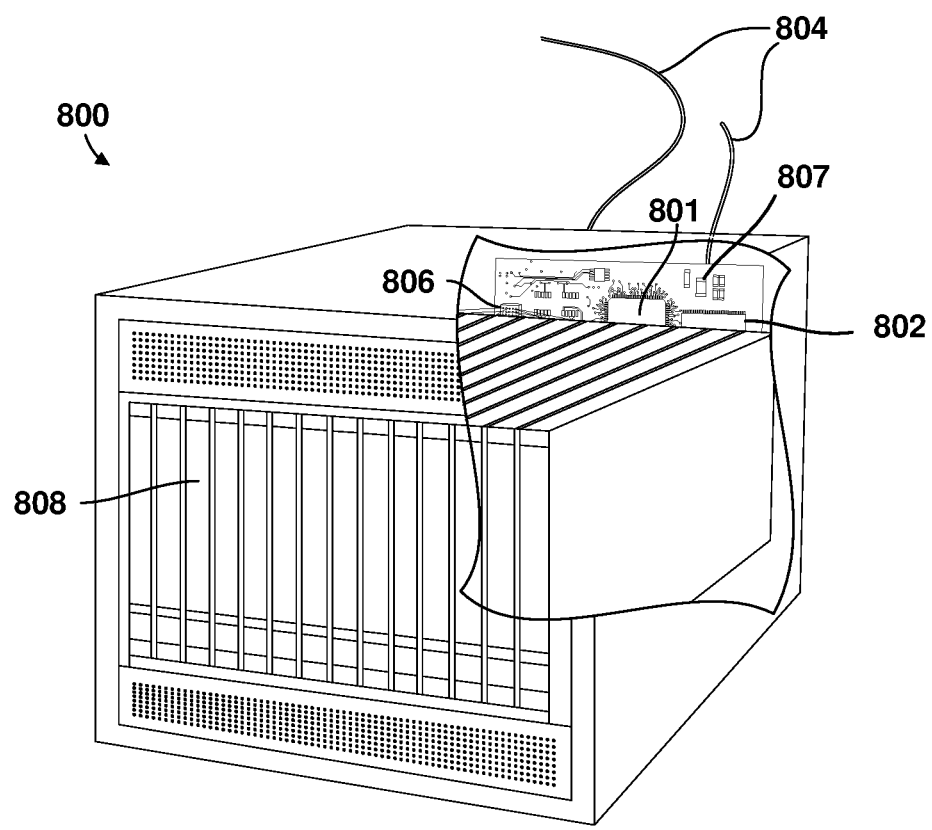
FIG. 8 is a component block diagram of a base station computing device suitable for use with various embodiments.

FIG. 8 is a component block diagram of an Edge server device suitable for use with various embodiments. Such Edge server devices (e.g., the Edge server device 200, 350, 402, 510) may include at least the components illustrated in FIG. 8. With reference to FIGS. 1-8, the Edge server device 800 may typically include a processor 801 coupled to volatile memory 802 and a large capacity nonvolatile memory, such as a disk drive 808. The Edge server device 800 also may include a peripheral memory access device 806 such as a floppy disc drive, compact disc (CD) or digital video disc (DVD) drive coupled to the processor 801. The Edge server device 800 also may include network access ports 804 (or interfaces) coupled to the processor 801 for establishing data connections with a network, such as the Internet or a local area network coupled to other system computers and servers. The Edge server device 800 may include one or more antennas 807 for sending and receiving electromagnetic radiation that may be connected to a wireless communication link. The Edge server device 800 may include additional access ports, such as USB, Firewire, Thunderbolt, and the like for coupling to peripherals, external memory, or other devices.

Figure 9:
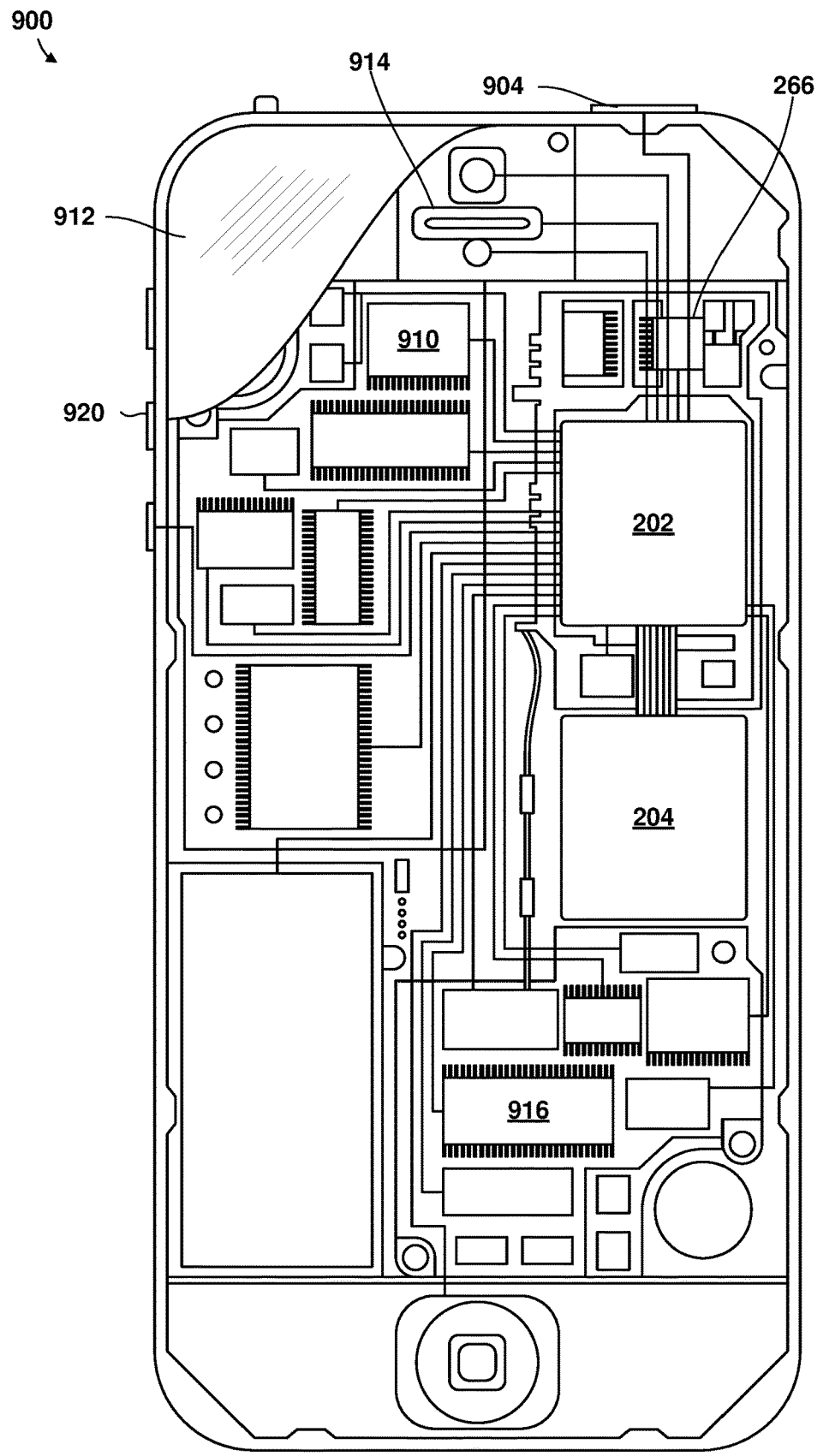
FIG. 9 is a component block diagram of a wireless device suitable for use with various embodiments.

FIG. 9 is a component block diagram of a wireless device 900 suitable for use with various embodiments. With reference to FIGS. 1-9, various embodiments may be implemented on a variety of wireless devices 900 (for example, the wireless device 120a-120e, 200, 320, 404), an example of which is illustrated in FIG. 9 in the form of a smartphone. The wireless device 900 may include a first SOC 202 (for example, a SOC-CPU) coupled to a second SOC 204 (for example, a 5G capable SOC). The first and second SOCs 202, 204 may be coupled to internal memory 916, a display 912, and to a speaker 914. Additionally, the wireless device 900 may include an antenna 904 for sending and receiving electromagnetic radiation that may be connected to a wireless transceiver 266 coupled to one or more processors in the first and/or second SOCs 202, 204. Wireless device 900 may include menu selection buttons or rocker switches 920 for receiving user inputs.

The wireless device 900 wireless device 900 may include a sound encoding/decoding (CODEC) circuit 910, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 266 and CODEC 910 may include a digital signal processor (DSP) circuit (not shown separately).

The processors of the Edge server device 800 and the wireless device 900 may be any programmable microprocessor, microcomputer or multiple processor chip or chips that can be configured by software instructions (applications) to perform a variety of functions, including the functions of some implementations described below. In some wireless devices, multiple processors may be provided, such as one processor within an SOC 204 dedicated to wireless communication functions and one processor within an SOC 202 dedicated to running other applications. Software applications may be stored in the memory 802, 916 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution, advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations 500, 600a, 600b, 600c, 700a, 700b, and 700c may be substituted for or combined with one or more operations of the methods and operations 500, 600a, 600b, 600c, 700a, 700b, and 700c.

Implementation examples are described in the following paragraphs. While some of the following implementation examples are described in terms of example methods, further example implementations may include: the example methods discussed in the following paragraphs implemented by an Edge server device or a wireless device including a processor configured with processor-executable instructions to perform operations of the methods of the following implementation examples; the example methods discussed in the following paragraphs implemented by an Edge server device or a wireless device including means for performing functions of the methods of the following implementation examples; and the example methods discussed in the following paragraphs may be implemented as a non-transitory processor-readable storage medium having stored thereon processor-executable instructions configured to cause a processor of an Edge server device or a wireless device to perform the operations of the methods of the following implementation examples.

Example 1. A method performed by a processor of an Edge server device for synchronous presentation of content delivered over a wireless communication network, including receiving in an Edge server device a decryption key for an encrypted content segment that is or will be delivered to a plurality of wireless devices over the wireless communication network, and sending the decryption key for the encrypted content segment from the Edge server device to the plurality of wireless devices after the encrypted content segment has been received by the plurality of wireless devices in a manner that enables the plurality of wireless devices to decrypt the encrypted content segment approximately simultaneously.

Example 2. The method of example 1, in which sending the decryption key for the encrypted content segment from the Edge server device to the plurality of wireless devices after the encrypted content segment has been received by the plurality of wireless devices in a manner that enables the plurality of wireless devices to decrypt the encrypted content segment approximately simultaneously includes sending the decryption key in a manner that enables the plurality of wireless devices to decrypt the encrypted content segment within five seconds of one another.

Example 3. The method of either of examples 1 and 2, in which sending the decryption key in a manner that enables the plurality of wireless devices to decrypt the encrypted content segment within five seconds of one another includes sending the decryption key to the plurality of wireless devices for reception within two seconds of one another.

Example 4. The method of any of examples 1-3, in which sending the decryption key in a manner that enables the plurality of wireless devices to decrypt the encrypted content segment within five seconds of one another includes sending the decryption key to the plurality of wireless devices in a manner that enables the plurality of wireless devices to receive the decryption key within five seconds of one another.

Example 5. The method of any of examples 1-4, in which sending the decryption key for the encrypted content segment from the Edge server device to the plurality of wireless devices after the encrypted content segment has been received by the plurality of wireless devices in a manner that enables the plurality of wireless devices to decrypt the encrypted content segment approximately simultaneously includes sending the decryption key at a predetermined time after the encrypted content segment was delivered to the plurality of wireless devices.

Example 6. The method of any of examples 1-5, in which sending the decryption key for the encrypted content segment from the Edge server device to the plurality of wireless devices after the encrypted content segment has been received by the plurality of wireless devices in a manner that enables the plurality of wireless devices to decrypt the encrypted content segment approximately simultaneously includes determining whether all wireless devices have received the encrypted content segment, and sending the decryption key for the encrypted content segment from the Edge server device to the plurality of wireless devices in response to determining that all wireless devices have received the encrypted content segment.

Example 7. The method of any of examples 1-6, in which sending the decryption key for the encrypted content segment from the Edge server device to the plurality of wireless devices after the encrypted content segment has been received by the plurality of wireless devices in a manner that enables the plurality of wireless devices to decrypt the encrypted content segment approximately simultaneously includes indicating a future time when the decryption key will be usable by the plurality of wireless devices to decrypt the encrypted content segment.

Example 8. The method of any of examples 1-7, further including receiving in the Edge server device a second decryption key for a second encrypted content segment that is or will be delivered to the plurality of wireless devices over the wireless communication network, and sending the second decryption key for the second encrypted content segment from the Edge server device to the plurality of wireless devices after the second encrypted content segment has been received by the plurality of wireless devices in a manner that enables the plurality of wireless devices to decrypt the second encrypted content segment approximately simultaneously.

Example 9. The method of any of example 8, in which the encrypted content segment and the second encrypted content segment each comprise an Instantaneous Decoder Refresh (IDR) frame.

Example 10. A method performed by a processor of a wireless device for receiving content over a wireless communication network and rendering the content within a time window, including receiving an encrypted content segment from the wireless communication network, receiving a decryption key for the encrypted content segment from an Edge server device, in which the decryption key is received after reception of the encrypted content segment, and decrypting the encrypted content segment to render a decrypted content segment using the received decryption key after receipt of the decryption key.

Example 11. The method of example 10, in which decrypting the encrypted content segment using the received decryption key includes decrypting the encrypted content segment in a secure zone of the wireless device.

Example 12. The method of either of examples 10 and 11, in which decrypting the encrypted content segment using the received decryption key includes decrypting the encrypted content segment upon receipt of the decryption key.

Example 13. The method of any of examples 10-12, in which decrypting the encrypted content segment using the received decryption key includes decrypting the encrypted content segment at a time indicated by the Edge server device.

Example 14. The method of any of examples 10-13, in which decrypting the encrypted content segment using the received decryption key and delivering the decrypted content segment to a content renderer is performed in a secure zone of the processor of the wireless device.

Example 15. The method of any of examples 10-14, further including receiving a second encrypted content segment from the wireless communication network, receiving a second decryption key for the second encrypted content segment from an Edge server device, in which the second decryption key is received after reception of the second encrypted content segment, and decrypting the second encrypted content segment using the received second decryption key.

Example 16. The method of any of examples 10-15, in which the encrypted content segment includes a segment of a content stream, and the method further includes receiving a user input indicating a wager on an event in the content stream, after rendering of the decrypted content segment and transmitting a message to a betting system indicating the wager.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of an edge server device for synchronous presentation of content delivered over a wireless communication network having a core network and an edge network configured to provide uniform synchronization of decryption key delivery across a plurality of wireless devices, comprising:
   receiving, in an edge server device, a decryption key for an encrypted content segment that is or will be delivered to the plurality of wireless devices over the wireless communication network via a core network from a content delivery server;
   determining, based on a rate of received queries of the plurality of wireless devices, the plurality of wireless devices have received the encrypted content segment;
   sending, in response to the determining the plurality of wireless devices have received the encrypted content segment, over the edge network, approximately simultaneously at a predetermined time after the encrypted content segment was delivered to the plurality of wireless devices by the content delivery server, the decryption key for the encrypted content segment from the edge server device to each of the plurality of wireless devices after the encrypted content segment has been received by the plurality of wireless devices in a manner that enables the plurality of wireless devices to decrypt the encrypted content segment approximately simultaneously, comprising sending the decryption key for the encrypted content segment from the edge server device to the plurality of wireless devices via the edge network, wherein the edge network has a lower latency than the core network delivering the encrypted content segment; and
   sending, over the edge network to each of the plurality of wireless devices, an indication of a future time when the decryption key will be usable by the plurality of wireless devices to decrypt the encrypted content segment, wherein the future time when the decryption key will be usable is the same for each of the plurality of wireless devices.

2. The method of claim 1, wherein sending the decryption key for the encrypted content segment from the edge server device to the plurality of wireless devices after the encrypted content segment has been received by the plurality of wireless devices in a manner that enables the plurality of wireless devices to decrypt the encrypted content segment approximately simultaneously comprises sending the decryption key via the edge network in a manner that enables the plurality of wireless devices to decrypt the encrypted content segment within five seconds of one another.

3. The method of claim 1, wherein sending the decryption key for the encrypted content segment from the edge server device to the plurality of wireless devices after the encrypted content segment has been received by the plurality of wireless devices in a manner that enables the plurality of wireless devices to decrypt the encrypted content segment approximately simultaneously comprises sending the decryption key at a predetermined time after the encrypted content segment was delivered to the plurality of wireless devices.

4. The method of claim 1, wherein the indication of the future time when the decryption key will be usable by the plurality of wireless devices to decrypt the encrypted content segment is sent with the decryption key.

5. The method of claim 1, further comprising:
receiving in the edge server device a second decryption key for a second encrypted content segment that is or will be delivered to the plurality of wireless devices over the wireless communication network via the core network from the content delivery server; and
sending the second decryption key for the second encrypted content segment from the edge server device to the plurality of wireless devices after the second encrypted content segment has been received by the plurality of wireless devices in a manner that enables the plurality of wireless devices to decrypt the second encrypted content segment approximately simultaneously, comprising sending the second decryption key for the second encrypted content segment from the edge server device to the plurality of wireless devices via the edge network, the edge network has a lower latency than the core network delivering the encrypted content segment.

6. The method of claim 5, wherein the encrypted content segment and the second encrypted content segment each comprise an Instantaneous Decoder Refresh (IDR) frame.

7. The method of claim 1, wherein the indication of the future time when the decryption key will be usable by the plurality of wireless devices to decrypt the encrypted content segment is sent within the decryption key.

8. An edge server device, comprising:
a processor configured with processor-executable instructions to:
receive in an edge server device a decryption key for an encrypted content segment that is or will be delivered to a plurality of wireless devices over a wireless communication network via a core network from a content delivery server, the wireless communication network having a core network and an edge network configured to provide uniform synchronization of decryption key delivery across the plurality of wireless devices;
determine, based on a rate of received queries of the plurality of wireless devices, the plurality of wireless devices have received the encrypted content segment;
send, in response to the determining the plurality of wireless devices have received the encrypted content segment, over the edge network, approximately simultaneously at a predetermined time after the encrypted content segment was delivered to the plurality of wireless devices by the content delivery server, the decryption key for the encrypted content segment from the edge server device to each of the plurality of wireless devices after the encrypted content segment has been received by the plurality of wireless devices in a manner that enables the plurality of wireless devices to decrypt the encrypted content segment approximately simultaneously, wherein the processor is configured to send the decryption key for the encrypted content segment from the edge server device to the plurality of wireless devices via the edge network, wherein the edge network has a lower latency than the core network delivering the encrypted content segment; and
send, over the edge network to each of the plurality of wireless devices, an indication of a future time when the decryption key will be usable by the plurality of wireless devices to decrypt the encrypted content segment, wherein the future time when the decryption key will be usable is the same for each of the plurality of wireless devices.

9. The edge server device of claim 8, wherein the processor is further configured with processor-executable instructions to send the decryption key via the edge network in a manner that enables the plurality of wireless devices to decrypt the encrypted content segment within five seconds of one another.

10. The edge server device of claim 9, wherein the processor is further configured with processor-executable instructions to send the decryption key to the plurality of wireless devices for reception within two seconds of one another.

11. The edge server device of claim 9, wherein the processor is further configured with processor-executable instructions to send the decryption key to the plurality of wireless devices in a manner that enables the plurality of wireless devices to receive the decryption key within five seconds of one another.

12. The edge server device of claim 8, wherein the processor is further configured with processor-executable instructions to send the decryption key at a predetermined time after the encrypted content segment was delivered to the plurality of wireless devices.

13. The edge server device of claim 8, wherein the indication of the future time when the decryption key will be usable by the plurality of wireless devices to decrypt the encrypted content segment is sent with the decryption key.

14. The edge server device of claim 8, wherein the processor is further configured with processor-executable instructions to:
receive in the edge server device a second decryption key for a second encrypted content segment that is or will be delivered to the plurality of wireless devices over the wireless communication network via the core network from the content delivery server; and
send over the edge network, approximately simultaneously at a predetermined time after the encrypted content segment was delivered to the plurality of wireless devices by the content delivery server, the second decryption key for the second encrypted content segment from the edge server device to each of the plurality of wireless devices after the second encrypted content segment has been received by the plurality of wireless devices in a manner that enables the plurality of wireless devices to decrypt the second encrypted content segment approximately simultaneously, wherein the processor is configured to send the second decryption key for the encrypted content segment from the edge server device to the plurality of wireless devices via the edge network, wherein the edge network has a lower latency than the core network delivering the second encrypted content segment.

15. The edge server device of claim 14, wherein the processor is further configured with processor-executable instructions such that the encrypted content segment and the second encrypted content segment each comprise an Instantaneous Decoder Refresh (IDR) frame.

16. The edge server device of claim 8, wherein the indication of the future time when the decryption key will be usable by the plurality of wireless devices to decrypt the encrypted content segment is sent within the decryption key.

17. A method performed by a processor of a wireless device for receiving content over a wireless communication network and rendering the content within a time window, the wireless communication network having a core network and an edge network configured to provide uniform synchronization of decryption key delivery across a plurality of wireless devices, comprising:
receiving an encrypted content segment from the wireless communication network via a core network from a content delivery server;
transmitting a query to an edge server device indicating the wireless device received the encrypted content segment;
receiving, over the edge network, a decryption key for the encrypted content segment from the edge server device, the edge server device being different from the content delivery server and the decryption key is transmitted to the wireless device based on a determination the plurality of wireless devices have received the encrypted content segment, wherein the determination is based on a rate of received queries by the edge server device, and wherein the decryption key is received after reception of the encrypted content segment via the edge network, wherein the edge network has a lower latency than the core network from which the encrypted content segment is received;
receiving, over the edge network, an indication of a future time when the decryption key will be usable by the wireless device to decrypt the encrypted content segment, wherein the future time when the decryption key will be usable by the wireless device is the same for each of the plurality of wireless devices; and
decrypting, at the future time, the encrypted content segment to render a decrypted content segment using the received decryption key after receiving the decryption key.

18. The method of claim 17, wherein decrypting the encrypted content segment using the received decryption key comprises decrypting the encrypted content segment in a secure zone of the wireless device.

19. The method of claim 17, wherein decrypting the encrypted content segment using the received decryption key comprises decrypting the encrypted content segment upon receipt of the decryption key.

20. The method of claim 17, wherein decrypting the encrypted content segment using the received decryption key comprises decrypting the encrypted content segment at a time indicated by the edge server device.

21. The method of claim 17, wherein decrypting the encrypted content segment using the received decryption key and delivering the decrypted content segment to a content renderer is performed in a secure zone of the processor of the wireless device.

22. The method of claim 17, further comprising:
receiving a second encrypted content segment from the wireless communication network via the core network from a content delivery server;
receiving a second decryption key for the second encrypted content segment from an edge server device, wherein the second decryption key is received after reception of the second encrypted content segment via the edge network, wherein the edge network has a lower latency than the core network from which the second encrypted content segment is received; and
decrypting the second encrypted content segment using the received second decryption key after receiving the second decryption key.

23. The method of claim 17, wherein the encrypted content segment comprises a segment of a content stream, and the method further comprises:
receiving a user input indicating a wager on an event in the content stream following rendering of the decrypted content segment; and
transmitting a message to a betting system indicating the wager.

24. A wireless device, comprising:
a processor configured with processor-executable instructions to:
receive an encrypted content segment from a wireless communication network via a core network from a content delivery server;
transmit a query to an edge server device indicating the wireless device received the encrypted content segment;
receive a decryption key for the encrypted content segment from the edge server device over an edge network configured to provide uniform synchronization of decryption key delivery across a plurality of wireless devices, the edge server device being different from the content delivery server and the decryption key is transmitted to the wireless device based on a determination the plurality of wireless devices have received the encrypted content segment, wherein the determination is based on a rate of received queries by the edge server device, wherein the decryption key is received after reception of the encrypted content segment via the edge network, and wherein the edge network has a lower latency than the core network from which the encrypted content segment is received;
receive, over the edge network, an indication of a future time when the decryption key will be usable by the wireless device to decrypt the encrypted content segment, wherein the future time when the decryption key will be usable by the wireless device is the same for each of the plurality of wireless devices; and
decrypt, at the future time, the encrypted content segment to render a decrypted content segment using the received decryption key after receiving the decryption key.

25. The wireless device of claim 24, wherein the processor is further configured with processor-executable instructions to decrypt the encrypted content segment in a secure zone of the wireless device.

26. The wireless device of claim 24, wherein the indication of the future time when the decryption key will be usable is received with the decryption key or within the decryption key.

27. The wireless device of claim 24, wherein the processor is further configured with processor-executable instructions to decrypt the encrypted content segment using the received decryption key and deliver the decrypted content segment to a content renderer in a secure zone of the processor of the wireless device.

28. The wireless device of claim 24, wherein the encrypted content segment comprises a segment of a content stream, and wherein the processor is further configured with processor-executable instructions to:

receive a user input indicating a wager on an event in the content stream following rendering of the decrypted content segment; and transmitting a message to a betting system indicating the wager.

\* \* \* \* \*